United States Patent
Lei et al.

(10) Patent No.: US 9,319,688 B2
(45) Date of Patent: Apr. 19, 2016

(54) MOVING IMAGE ENCODING APPARATUS

(71) Applicant: FUJITSU LIMITED, Kawasaki-shi, Kanagawa (JP)

(72) Inventors: Xuying Lei, Kawasaki (JP); Hidenobu Miyoshi, Kawasaki (JP); Satoshi Shimada, Kawasaki (JP); Tomonori Kubota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 274 days.

(21) Appl. No.: 14/156,078

(22) Filed: Jan. 15, 2014

(65) Prior Publication Data

US 2014/0211845 A1 Jul. 31, 2014

(30) Foreign Application Priority Data

Jan. 29, 2013 (JP) .................................. 2013-014721

(51) Int. Cl.
| | |
|---|---|
| H04N 7/12 | (2006.01) |
| H04N 19/117 | (2014.01) |
| H04N 19/159 | (2014.01) |
| H04N 19/176 | (2014.01) |

(52) U.S. Cl.
CPC ........... *H04N 19/117* (2014.11); *H04N 19/159* (2014.11); *H04N 19/176* (2014.11)

(58) Field of Classification Search
IPC ..................................................... H04N 19/105
See application file for complete search history.

(56) References Cited

U.S. PATENT DOCUMENTS

| | | | | |
|---|---|---|---|---|
| 9,113,169 | B2 * | 8/2015 | Tsai ..................... | H04N 19/176 |
| 2009/0141798 | A1 * | 6/2009 | Adachi ................ | H04N 19/136 |
| | | | | 375/240.12 |
| 2009/0274216 | A1 | 11/2009 | Kato et al. | |
| 2010/0014763 | A1 | 1/2010 | Wittmann et al. | |
| 2010/0220788 | A1 * | 9/2010 | Wittmann ........ | H04N 19/00587 |
| | | | | 375/240.16 |
| 2012/0093426 | A1 * | 4/2012 | Sato ........................ | G06T 9/004 |
| | | | | 382/233 |
| 2012/0140820 | A1 * | 6/2012 | Kondo ................. | H04N 19/176 |
| | | | | 375/240.03 |
| 2012/0189217 | A1 | 7/2012 | Wittmann et al. | |
| 2013/0022281 | A1 * | 1/2013 | Sato ....................... | H04N 19/82 |
| | | | | 382/224 |
| 2013/0188697 | A1 * | 7/2013 | Ye ..................... | H04N 19/00575 |
| | | | | 375/240.12 |

FOREIGN PATENT DOCUMENTS

| | | |
|---|---|---|
| JP | 2010-183162 | 8/2010 |
| WO | 2007/111292 | 10/2007 |
| WO | 2008/069073 | 6/2008 |

* cited by examiner

*Primary Examiner* — Tracy Li
(74) *Attorney, Agent, or Firm* — Fujitsu Patent Center

(57) ABSTRACT

A moving image encoding apparatus configured to use an image one frame before a target image for encoding to calculate a filtering coefficient for each intra prediction mode of a decoded image from the decoded image and the original image, extracts a filtering coefficient to perform a filtering process to a reference pixel for intra prediction mode determination of a peripheral block of the target block for encoding according to the intra prediction mode of the peripheral block and to generate a reference image for intra prediction mode determination, uses the reference image for intra prediction mode determination to select an intra prediction mode for the target block for encoding, and generates an intra prediction image of the target block for encoding.

5 Claims, 24 Drawing Sheets

FIG. 14

| INTRA PREDICTION MODE (INTRA PREDICTION DIRECTION) | DECODED PIXEL | ORIGINAL PIXEL |
|---|---|---|
| 0 | $Recon_0[4]$ | $Org_0[4]$ |
| 1 | $Recon_1[4]$ | $Org_1[4]$ |
| 2 | $Recon_2[4]$ | $Org_2[4]$ |
| ⋮ | ⋮ | ⋮ |
| i | $Recon_i[4]$ | $Org_i[4]$ |
| ⋮ | ⋮ | ⋮ |
| N | $Recon_N[4]$ | $Org_N[4]$ |

FIG. 21

| VARIANCE GROUP | DECODED PIXEL | ORIGINAL PIXEL |
|---|---|---|
| 0 | $Recon_0[4]$ | $Org_0[4]$ |
| 1 | $Recon_1[4]$ | $Org_1[4]$ |

MOVING IMAGE ENCODING APPARATUS

CROSS-REFERENCE TO RELATED APPLICATION

This application is based upon and claims the benefit of priority of the prior Japanese Patent Application No. 2013-014721, filed on Jan. 29, 2013, the entire contents of which are incorporated herein by reference.

FIELD

The present invention relates to a moving image encoding apparatus.

BACKGROUND

Moving images are a plurality of static images which are temporally sequential. Since the amount of information of the moving image data is generally larger than that of the static image data and the like, data compression is required for the transmission of the moving image data. The moving image data can be compressed by a moving image encoding process for example. Here, the term "moving image encoding process" denotes an encoding process for converting the data stream of the moving image data into another data stream. The moving image encoding process can compress moving image data the amount of which is large. Thus, the moving image encoding techniques including the moving image encoding process are employed when moving images are transmitted or recorded in the digital terrestrial broadcasting, Blu-Ray®, digital video cameras and the like. H.264/AVC is one of the moving image encoding schemes. In addition, HEVC, which is a next-generation moving image encoding technique achieving more than or equal to twice as much as the encoding efficiency of H.264/AVC, will be standardized in the future.

FIG. 1 is a diagram illustrating an example of a configuration of a moving image encoding apparatus employing a common moving image encoding scheme including H.264/AVC and HEVC. One general characteristic of moving images is that the correlations in a frame or between frames are strong. The scheme which uses the correlations in a frame to generate prediction pixels for the target pixels for encoding is referred to as intra prediction scheme. The scheme which uses the correlations between frames is referred to as inter prediction scheme. An encoder performs an orthogonal transformation, a quantization process and a variable length encoding to the prediction errors of the intra prediction scheme or the inter prediction scheme to generate bit streams. The orthogonal transformation is a spatial frequency conversion of images and resolves the prediction errors into amplitude components with respect to each frequency. The quantization process is a process for dividing by a quantization step size the coefficients obtained from the orthogonal transformation and rounding off the results of the division. The orthogonal transformation and the quantization process reduce a large amount of information.

FIG. 2 is a diagram illustrating an example of a configuration of a moving image encoding apparatus employing a common moving image encoding scheme. A decoder reconstructs (decodes) images by inverse procedures to those performed by the encoder.

An encoder includes a decoder. The decoder included in the encoder is referred to as local decoder. The local decoder uses an encoded image as a predicted value for the following image to be encoded to encode the following image.

<Intra Prediction>

Explanations are given to the intra prediction here. The intra prediction is a prediction method of dividing the pixels in one frame into a plurality of blocks and predicting the pixels in the peripheral blocks from the pixels in one block by using the characteristics that the pixel values (color and luminance and the like) of the pixels in the neighboring blocks are similar in order to reduce the amount of data. For example, in the H.264 standard (decoder), the pixels in the peripheral blocks which have been decoded among the peripheral blocks as target blocks for decoding are referenced and then prediction images are generated.

In the intra prediction, the pixels in one frame are divided into a plurality of small blocks and the decoding processes are performed on the basis of a block. In the intra prediction, the pixels in a target block for encoding are predicted from the pixels (pixel values) in the peripheral blocks of the target block for encoding which have been encoded, the predicted residues are encoded, and then the amount of information may be reduced.

In the intra prediction, the encoder generates and references decoded images which are the same as decoded images generated by the decoder in order to match the prediction images generated by the encoder with the prediction images generated by the decoder. Therefore, a local decoder including an inverse quantization and inverse orthogonal transformation unit is provided in the encoder. The encoder uses decoded images generated in the encoder as reference images to generate prediction images.

<Intra Prediction Mode Determination>

Encoder performs an intra prediction mode determination for fulfilling the potential of the intra prediction performance. The intra prediction mode determination unit of the encoder selects one intra prediction mode among a plurality of intra prediction modes (for example, prediction directions). In one form of the selection for example, the intra prediction mode determination unit calculates the SAD (Sum of Absolute Difference: the sum of absolute values of the prediction errors between input images and prediction images) in each intra prediction mode and uses the calculation results as encoding costs to select one mode in which the encoding cost is minimized.

FIG. 3 is a diagram illustrating an example of a prediction direction in the intra prediction for HEVC. The intra prediction for HEVC employs thirty five types of prediction directions. The prediction direction is one example of the intra prediction mode. The intra prediction mode is also referred to as prediction mode.

When the intra prediction mode determination is performed, reference images for mode determination are generated from reference pixels in the peripheral blocks. The peripheral blocks are blocks adjacent to the target block for encoding. The reference pixels are pixels which are included in the peripheral blocks and adjacent to the target block for encoding.

FIG. 4 is a diagram illustrating an example of the location in which the peripheral blocks of a target block for encoding in HEVC are arranged. As illustrated in FIG. 4, in HEVC, blocks A, B, C, D and E are referenced for example when the target block for encoding is encoded. And when a prediction image used for encoding is generated, decoded pixels in the peripheral blocks (reference blocks) are referenced. Therefore, in general, the accuracy of the intra prediction mode determination is improved because the decoded pixels are also referenced in the intra prediction mode determination.

PATENT DOCUMENT

[Patent document 1] Japanese Laid-Open Patent Publication No. 2010-183162
[Patent document 2] International Publication Pamphlet No. 2007/111292
[Patent document 3] International Publication Pamphlet No. 2008/069073

SUMMARY

A technique disclosed herein employs the following.
Namely, a first embodiment provides:
a moving image encoding apparatus which uses intra prediction to encode an input original image input by frame on the basis of a block in the original image, the moving image encoding apparatus including:
a decoded image memory configured to store a decoded image of an image one frame before the input original image which includes a target block for encoding, the target block for encoding being a block to be encoded in the input original image;
an original image memory configured to store an original image corresponding to the decoded image;
a decoded image peripheral information storing unit configured to store an intra prediction mode for each block in the decoded image;
a filtering coefficient classification unit configured to calculate a filtering coefficient from the decoded image and the stored original image for each intra prediction mode of the decoded image;
an encoding target block peripheral information readout unit configured to read an intra prediction mode for a peripheral block of the target block for encoding;
a filtering coefficient selecting unit configured to select a filtering coefficient based on the intra prediction mode for the peripheral block for each peripheral block;
an original image correcting unit configured to use the filter coefficients selected by the filtering coefficient selecting unit to perform a filtering process to a reference pixel for intra prediction mode determination of the peripheral block and configured to calculate a pixel value as a decoded image of the reference pixel for intra prediction mode determination of the peripheral block;
a reference image generating unit configured to generate a reference image for intra prediction mode determination from the pixel value as the decoded image obtained from the original image correcting unit;
an intra prediction mode determination unit configured to use the reference image generated by the reference image generating unit to select an intra prediction mode for the target block for encoding; and
an intra prediction image generating unit configured to use the intra prediction mode selected by the intra prediction mode determination unit to generate an intra prediction image of the target block for encoding.

A technique disclosed herein may be achieved by executing a program in an information processing apparatus. That is, a configuration disclosed herein is also a program for executing processes performed by each unit in the above embodiment to an information processing apparatus or a non-transitory computer-readable storage medium in which the program is stored. In addition, a configuration disclosed herein is also stipulated by a method for performing the processes performed by each unit as described above in an information processing apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 14 is a diagram illustrating an example of the classification of decoded pixels and original pixels corresponding to the locations of reference pixels in a filtering coefficient classification unit;
FIG. 21 is a diagram illustrating an example of the classification of decoded pixels and original pixels corresponding to the locations of reference pixels in a filtering coefficient classification unit.

DESCRIPTION OF EMBODIMENTS

Figure 5:
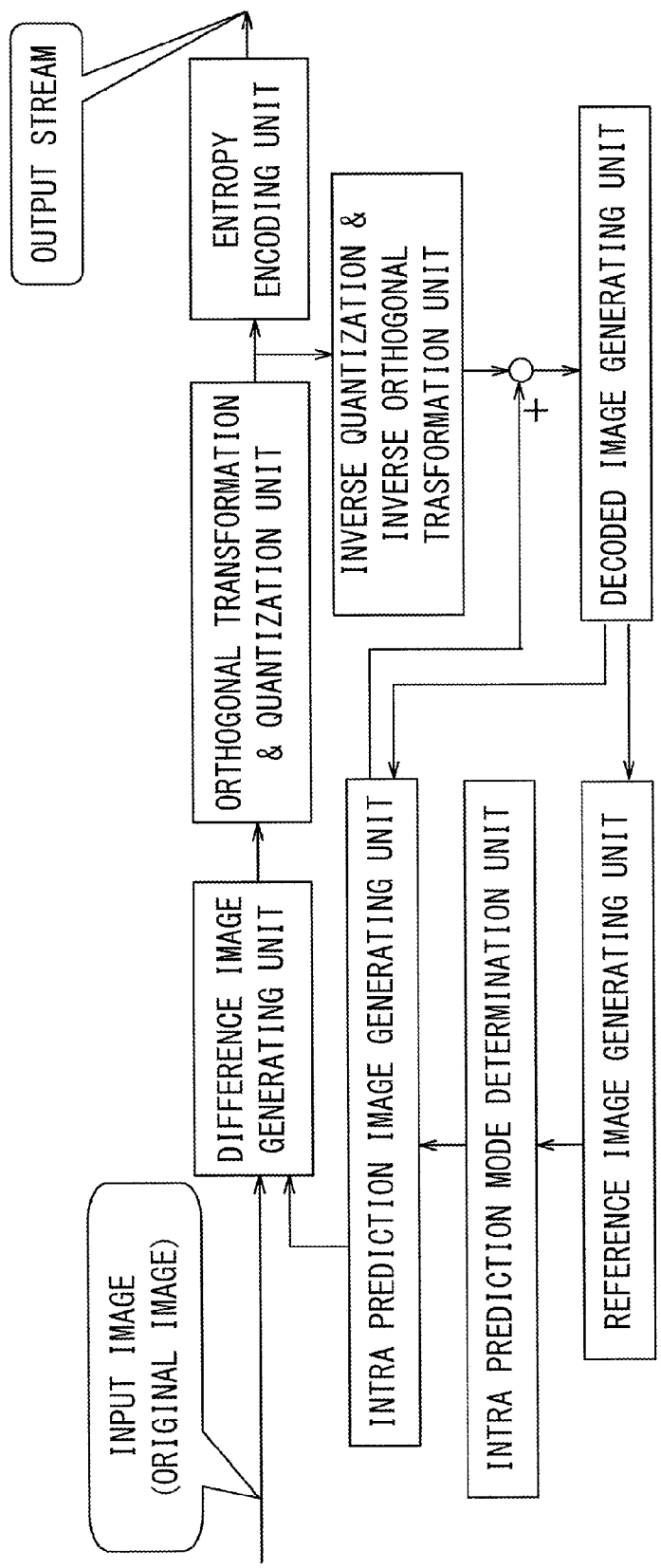
FIG. 5 is a diagram illustrating an example of a conventional encoder.
Figure 6:
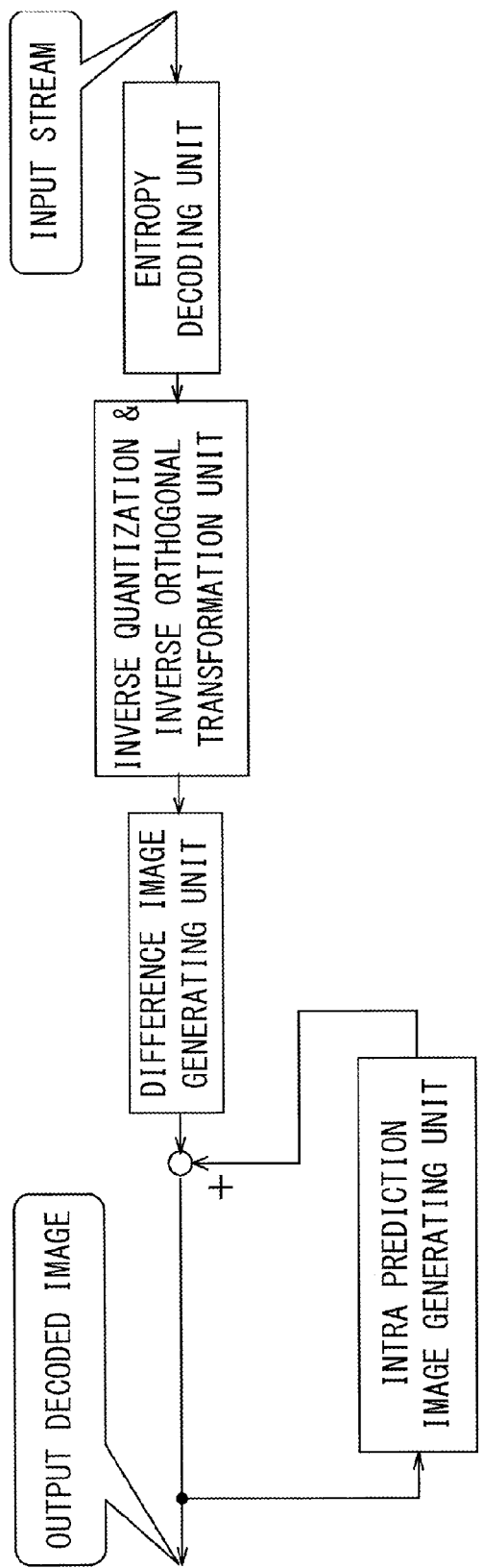
FIG. 6 is a diagram illustrating an example of a conventional decoder.

FIGS. 5 and 6 are diagrams respectively illustrating an example of a conventional encoder and an example of a conventional decoder. The encoder illustrated in FIG. 5 encodes the input images (original images) are encoded using the intra prediction and performs the intra prediction determination by referencing decoded pixels in the encoder.

Figure 1:
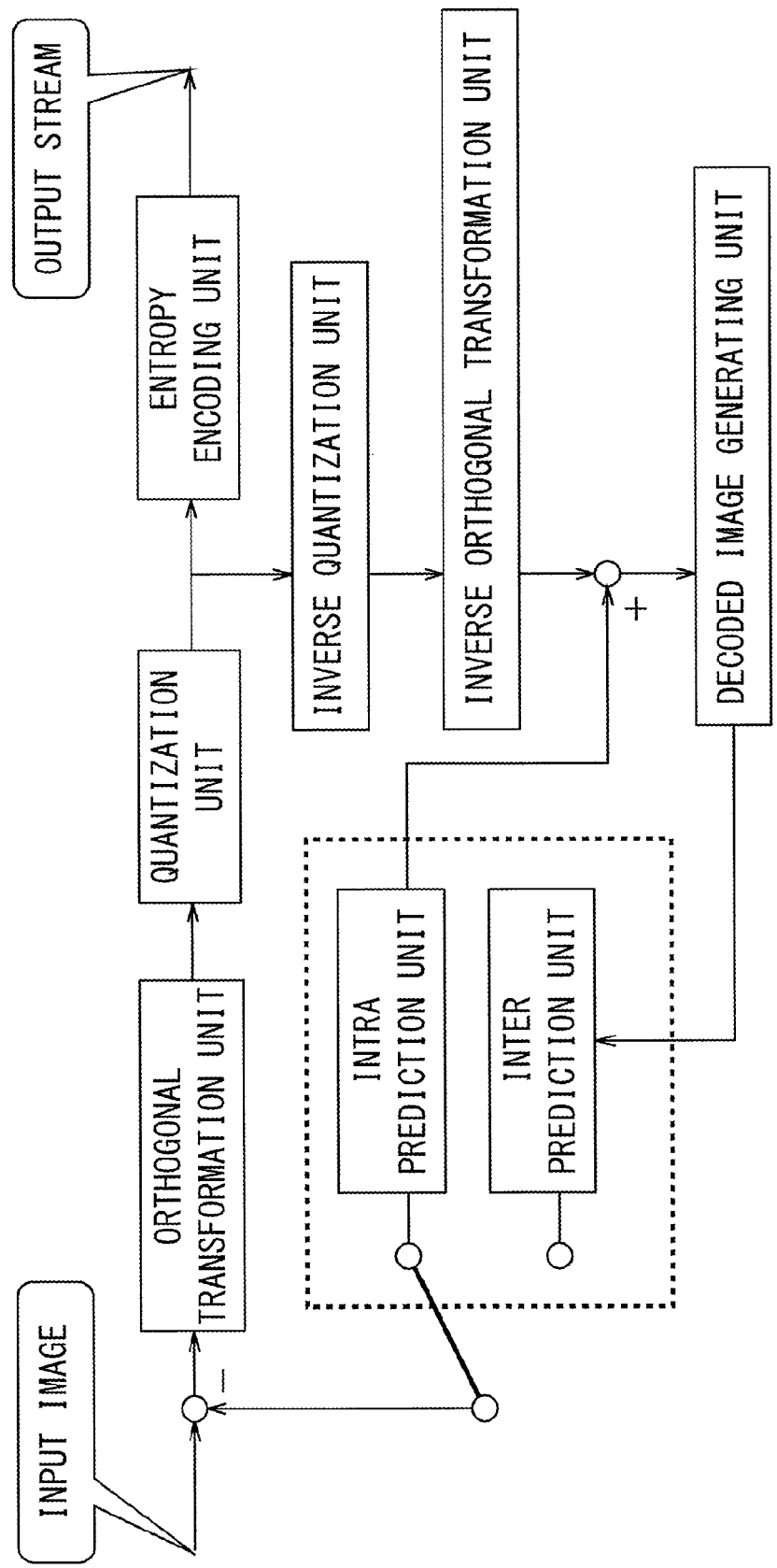
FIG. 1 is a diagram illustrating an example of a configuration of a moving image encoding apparatus employing a common moving image encoding scheme including H.264/AVC and HEVC.
Figure 2:
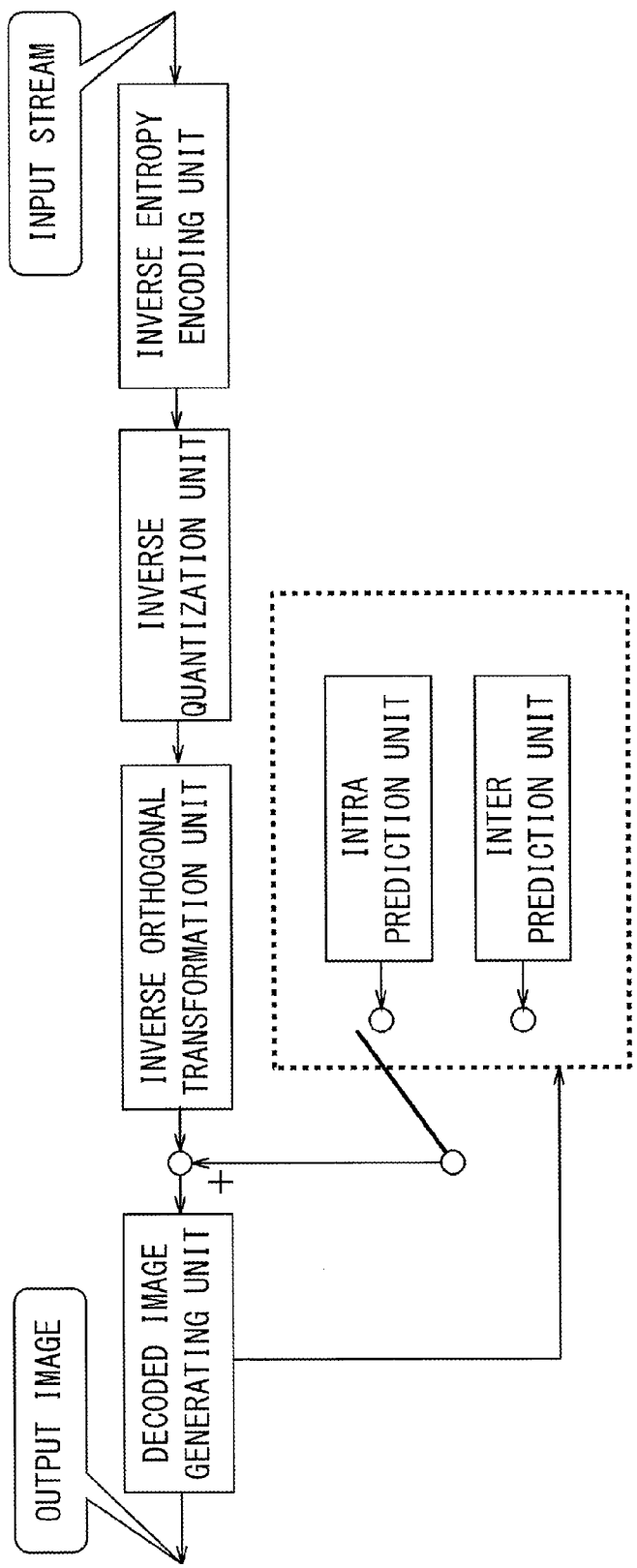
FIG. 2 is a diagram illustrating an example of a configuration of a moving image encoding apparatus employing a common moving image encoding scheme.
Figure 3:
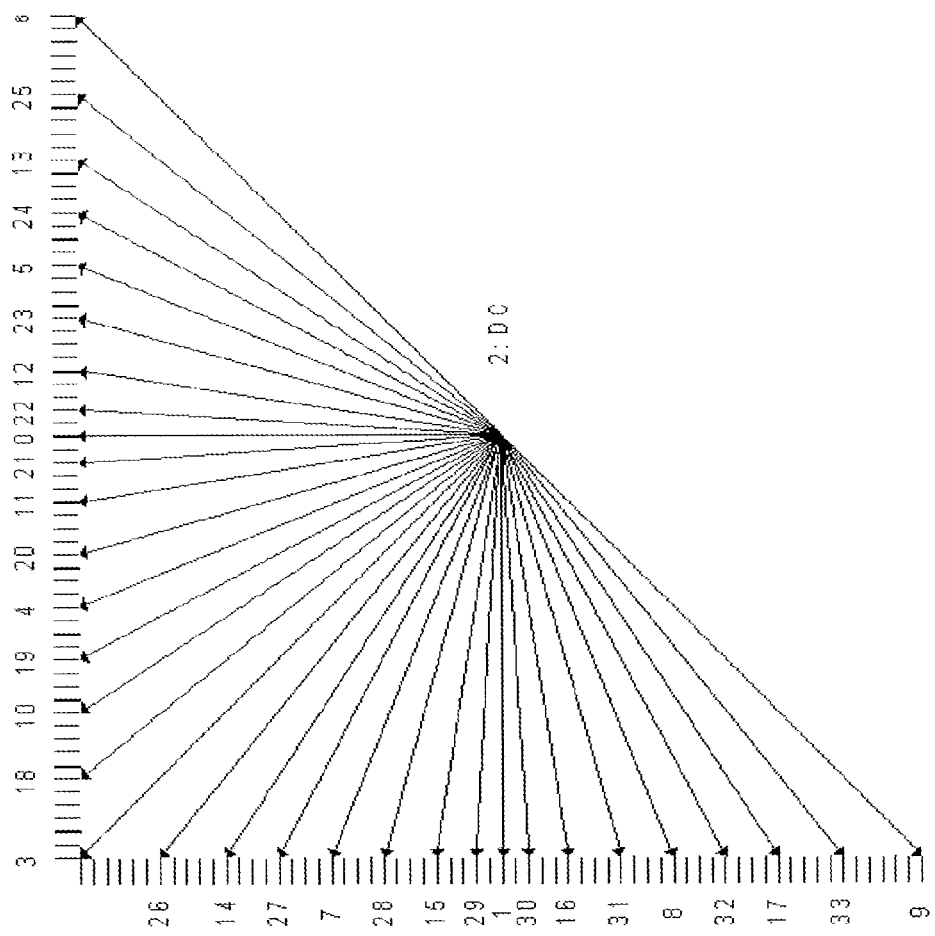
FIG. 3 is a diagram illustrating prediction directions of an intra prediction in HEVC.
Figure 4:
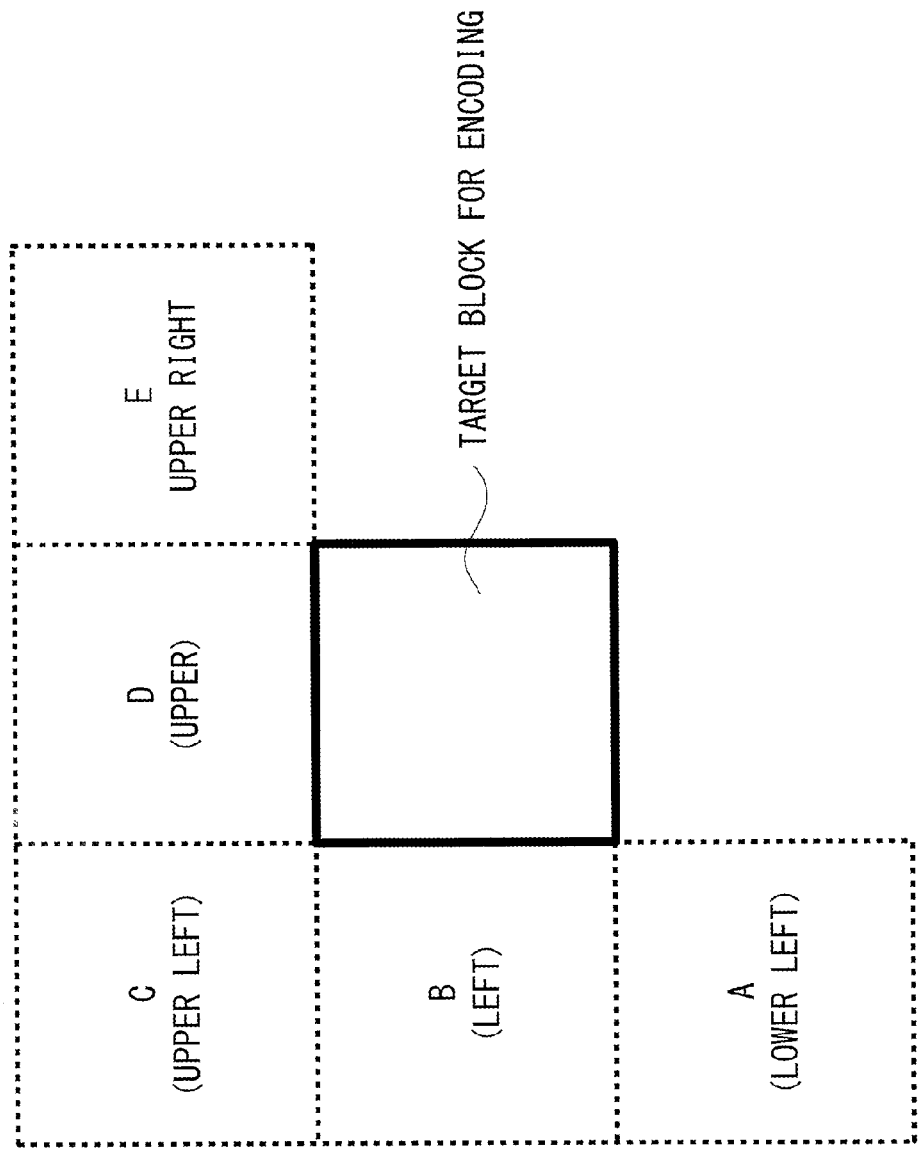
FIG. 4 is a diagram illustrating an example of locations of peripheral blocks of a target block for encoding in HEVC.

When decoded images are referenced in the intra prediction mode determination, the pixel values in the peripheral encoded blocks (blocks A, B, C, D and E in FIG. 4) including the reference pixels used for the intra prediction mode determination are used. Thus, the peripheral encoded blocks (peripheral blocks) are decoded in the prediction mode which is selected as the best. Namely, since there are dependencies between the peripheral blocks and the target block for encoding in one frame, it is difficult to achieve parallelization when this scheme is implemented in hardware. In addition, since orthogonal transformation and quantization processes and inverse quantization and inverse orthogonal transformation processes are performed for referencing decoded pixels, the amount of operations for obtaining decoded pixels becomes large.

Further, there is a technique for enabling the parallel processing of generating reference images for intra prediction mode determination to reduce the processing time by referencing the original images in the peripheral blocks at the intra prediction mode determination part, which is a stage prior to the intra prediction. However, with this technique, since a quantization error occurs between an original image and a decoded image, the accuracy of the intra prediction mode determination is decreased when the original images are referenced instead of the decoded images.

Moreover, there is another technique for suppressing the deterioration of the prediction mode determination accuracy by performing pseudo discrete cosine transformation and quantization conversion processes to the original images of the peripheral blocks which are referenced for the intra prediction mode determination to obtain approximate local decoded images. However, with this technique, the amount of operations for the pseudo discrete cosine transformation and quantization conversion processes becomes larger.

The details of embodiments are described below with reference to the drawings. However, the configurations in the embodiments are examples and the configurations disclosed herein are not limited to the specific configurations as described below. Further, arbitrary specific configurations appropriate for the embodiments may be employed when the configurations disclosed herein are implemented.

EMBODIMENTS

Configuration Example

Figure 7:
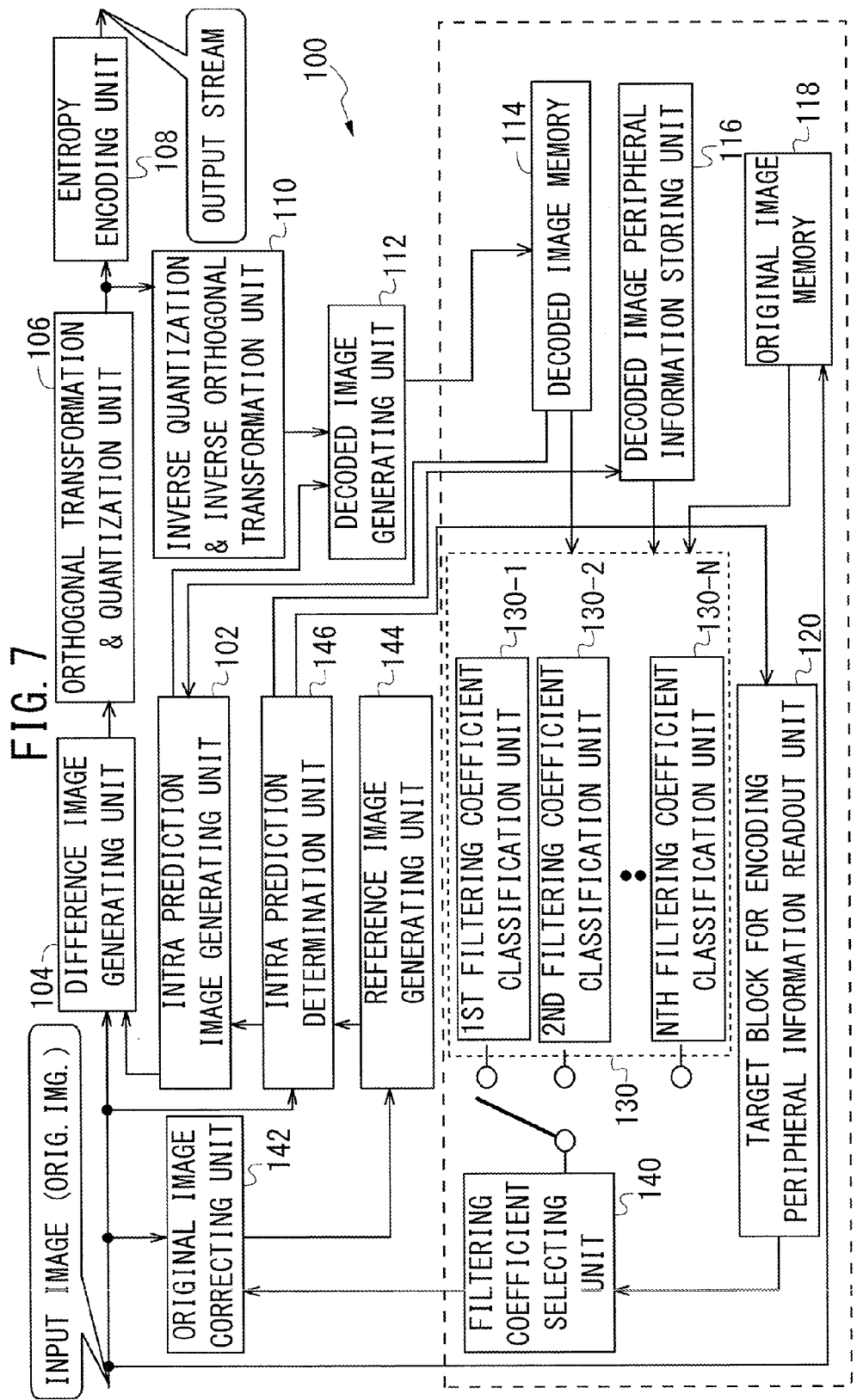
FIG. 7 is a diagram illustrating an example of a moving image encoding apparatus according to one embodiment.

FIG. 7 is a diagram illustrating an example of a moving image encoding apparatus according to the present embodiment. The moving image encoding apparatus 100 includes an intra prediction image generating unit 102, a difference image generating unit 104, an orthogonal transformation and quantization unit 106, an entropy encoding unit 108, an inverse quantization and inverse orthogonal transformation unit 110, a decoded image generating unit 112 and a decoded image memory 114. In addition the moving image encoding apparatus 100 includes a decoded image peripheral information storing unit 116, an original image memory 118, a target block for encoding peripheral information readout unit 120, a filtering coefficient classification unit 130 and a filtering coefficient selecting unit 140. Further, the moving image encoding apparatus 100 includes an original image correcting unit 142, a reference image generating unit 144 and an intra prediction mode determination unit 146.

The intra prediction image generating unit 102 uses the intra prediction mode (prediction mode) for the target block for encoding which is determined by the intra prediction mode determination unit 146 to obtain decoded pixels in the peripheral blocks of the target block for encoding from the decoded image memory 114. The intra prediction image generating unit 102 references the obtained decoded pixels to generate a prediction image of the target block for encoding and output the generated image to the difference image generating unit 104.

The difference image generating unit 104 calculates a difference image between the prediction image of the target block for encoding which is generated by the intra prediction image generating unit 102 and the input image (original image), and then outputs the difference image to the orthogonal transformation and quantization unit 106.

The orthogonal transformation and quantization unit 106 performs an orthogonal transformation of the difference image input from the difference image generating unit 104. In addition, the orthogonal transformation and quantization unit 106 quantizes frequency signals obtained from the orthogonal transformation processes and outputs the quantized signals to the entropy encoding unit 108 and the inverse quantization and inverse orthogonal transformation unit 110. The orthogonal transformation and quantization unit 106 may be divided into an orthogonal transformation unit and a quantization unit.

The entropy encoding unit 108 performs an entropy encoding (variable-length encoding) to the input quantized signals and outputs the encoded signals by stream output. The entropy encoding is a process for allocating a variable-length code to a signal according to the occurrence rate of a symbol.

The inverse quantization and inverse orthogonal transformation unit 110 performs an inverse quantization process and an inverse orthogonal transformation process to the input quantized signals. The inverse quantization and inverse orthogonal transformation unit 110 outputs the processed signals to the decoded image generating unit 112. Since the inverse quantization and inverse orthogonal transformation unit 110 performs a decoding process, the signals which are similar to the difference image obtained before the encoding are obtained. The inverse quantization and inverse orthogonal transformation unit 110 may be divided into an inverse quantization unit and an inverse orthogonal transformation unit.

The decoded image generating unit 112 adds the prediction image output from the intra prediction image generating unit 102 to the difference image decoded by the inverse quantization and inverse orthogonal transformation unit 110 to generate image data of the present target block for encoding. The decoded image generating unit 112 outputs (stores) the generated image data to the decoded image memory 114.

The decoded image memory 114 stores the decoded images generated by the decoded image generating unit 112 as new decoded image data. The filtering coefficient classification unit 130 and the intra prediction image generating unit 102 retrieve the stored decoded images from the decoded image memory 114.

The decoded image peripheral information storing unit 116 stores an intra prediction mode (prediction direction) for each block as for the decoded image of an image one frame before the target image for encoding. The decoded image peripheral information storing unit 116 outputs an intra prediction mode in response to a request from the filtering coefficient classification unit 130.

The original image memory stores the input image (original image) data and outputs the stored data to the filtering coefficient classification unit 130.

The encoding target block peripheral information readout unit 120 stores the prediction directions of the peripheral blocks of a target block for encoding.

The filtering coefficient classification unit 130 includes N filtering coefficient classification units (the first filtering coefficient classification unit 130-1, . . . , the Nth filtering coefficient classification unit 130-N). N denotes the number of types of prediction modes (for example, prediction directions). The number of types of prediction modes is for example the number of types of prediction directions. A plurality of prediction modes (for example, similar prediction directions) may be handled as one group of prediction modes so that the number of types of prediction modes is reduced. The filtering coefficient classification unit 130 reads out from the decoded image peripheral information storing unit 116 prediction modes for the peripheral blocks in which reference pixels for the intra prediction mode determination of the target block for processing are included. The filtering coefficient classification unit 130 reads out the decoded pixel and the original pixel for the reference pixel for the intra prediction mode determination as for each readout prediction mode (prediction direction) and calculates a filtering coefficient from the decoded pixel and the original pixel as for each prediction mode. The filtering coefficient classification unit 130 uses the time correlations of moving images to calculate the filtering coefficient by using the decoded image data of a picture one frame before the picture which is currently being encoded which is obtained from the decoded image memory 114 and the original image data which is obtained from the original image memory 118.

The filtering coefficient selecting unit 140 reads out the prediction modes (prediction directions) for the peripheral blocks from the encoding target block peripheral information readout unit 120. The filtering coefficient selecting unit 140 selects filtering coefficients for categories (prediction modes) with similar characteristics from the filtering coefficients output from the filtering coefficient classification unit 130 in accordance with the types of prediction modes (prediction directions) which has been read out.

The original image correcting unit 142 estimates pixel values which are equivalent to the decoded image of the original image by multiplying the values of the reference pixels for the intra prediction mode determination for the peripheral blocks of the target block for encoding by filtering coefficients selected by the filtering coefficient selecting unit 140, corrects the pixel values, and outputs the corrected pixel values to the reference image generating unit 144.

The reference image generating unit 144 uses the pixels obtained after the original reference pixels for intra prediction mode determination are corrected to generate a reference image for intra prediction mode determination and outputs the reference image to the intra prediction mode determination unit 146.

The intra prediction mode determination unit 146 uses the reference image output by the reference image generating unit 144 to select a prediction mode from the plurality of intra prediction modes as for the target block for encoding and outputs the selected prediction mode to the intra prediction image generating unit 102. The intra prediction mode determination unit 146 notifies the encoding target block peripheral information readout unit 120 of the prediction mode for the target block for encoding.

The moving image encoding apparatus 100 is built by a general-purpose computer such as a PC (Personal Computer) or a dedicated computer such as a server machine. Additionally, the moving image encoding apparatus 100 is built by a dedicated or general-purpose computer such as a WS (Work Station) and a PDA (Personal Digital Assistant) or an electronic device equipped with the computer. Further, the moving image encoding apparatus 100 is built by a dedicated computer or a general-purpose computer such as a smartphone, a mobile phone and a car navigation system or an electronic device equipped with the computer.

Figure 8:
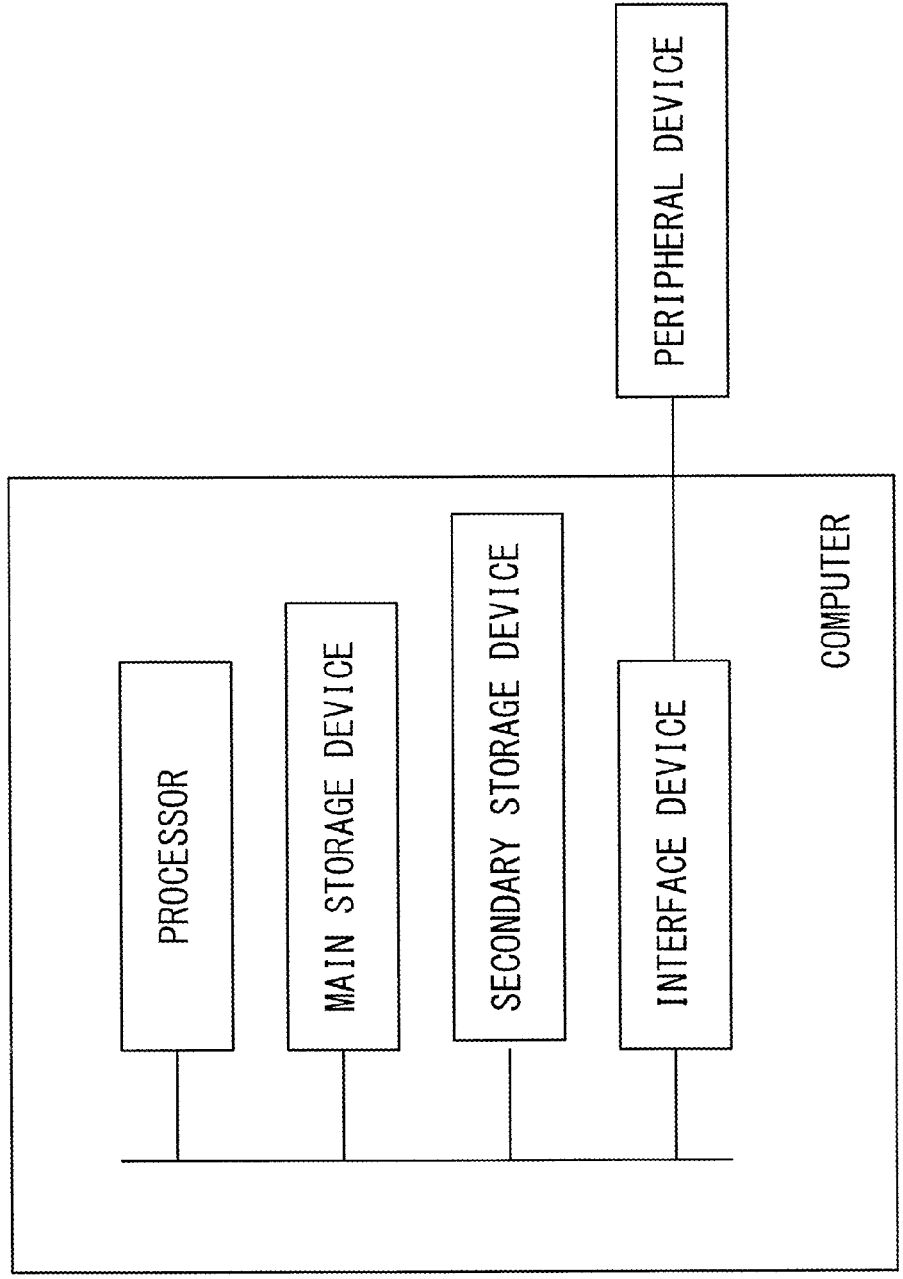
FIG. 8 is a diagram illustrating a configuration of a computer.

FIG. 8 is a diagram illustrating an example of a configuration of a computer. The computer, namely information processing apparatus, includes a processor, a main storage device, a secondary storage device and an interface device such as a communication interface device which is an interface device for peripheral devices. The main storage device and the secondary storage device are computer readable recoding media.

The computer achieves functions in accordance with given objectives using the processor to load programs stored in the recording media onto the work area in the main storage device and execute the programs to control the peripheral devices.

The processor is, for example, a CPU (Central Processing Unit) or a DSP (Digital Signal Processor). The main storage device includes, for example, a RAM (Random Access Memory) or a ROM (Read Only Memory).

The secondary storage device is, for example, an EPROM (Erasable Programmable ROM) and an HDD (Hard Disk Drive). In addition, the secondary storage device includes a removable medium, namely a portable recoding medium. The removable medium is, for example, a USB (Universal Serial Bus) memory or a disk recoding medium such as a CD (Compact Disc) and a DVD (Digital Versatile Disc).

The communication interface device is, for example, a LAN (Local Area Network) interface board or a wireless communication circuit for wireless communication.

The peripheral devices include input devices such as a keyboard and a pointing device and output devices such as a display device and a printer as well as the secondary storage device and the communication interface device as described above. In addition, the input devices include input devices for video and image such as a camera and input devices for audio such as a microphone. Further, the output devices include output devices for audio such as a speaker. The interface device may be connected with a plurality of peripheral devices.

In the computer building the moving image encoding apparatus 100, the processor loads programs stored in the secondary storage device onto the main storage device and executes the programs to perform the function as each processing unit. On the other hand, the decoded image memory 114 and the original image memory 118 are provided in the storage areas in the main storage device or the secondary storage device.

Each unit of the moving image encoding apparatus 100 is achieved by employing the configuration elements of the hardware, the configuration elements of the software or the combinations of these elements.

The configuration elements of the hardware are hardware circuits including for example an FPGA (Field Programmable Gate Array), an Application Specific Integrated Circuit (ASIC), a gate array, a combination of logical gates and an analog circuit and the like.

The configuration elements of the software are parts for performing given processes as software. The configuration elements are not the conceptual elements which limit the languages and the development environments for building the software.

The steps for describing a program include processes which are sequentially performed in the order as described and processes which is not necessarily performed sequentially but is performed in parallel or individually.

Operation Example

The operations of the moving image encoding apparatus 100 are described below. Image data encoded in the moving image encoding apparatus 100 is decoded as a decoded image in the moving image decoding apparatus. The moving image encoding apparatus 100 encodes the input moving image block by block on a frame to frame basis. Here, one frame of image to be encoded is referred to as a target image for encoding. The target image for encoding is divided into a plurality of blocks. In the target image for encoding, a block to be encoded is referred to as a target block for encoding. Here, encoding of one target block for encoding in a target image for encoding is described.

Figure 9:
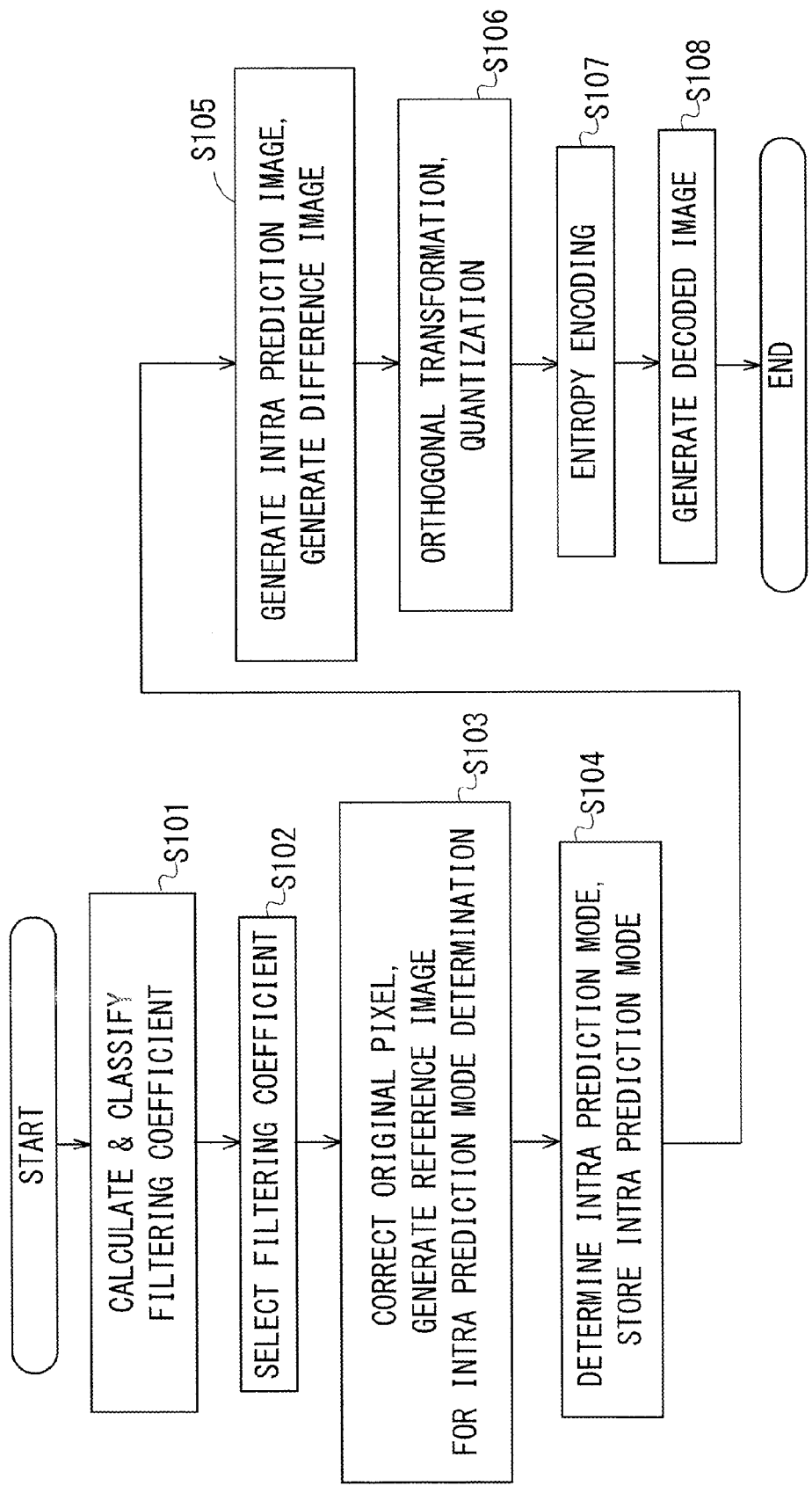
FIG. 9 is a diagram illustrating an example of an operation flow of encoding a target block for encoding in a moving image encoding apparatus.

FIG. 9 is a diagram illustrating an example of an operation flow for encoding a target block for encoding in the moving image encoding apparatus.

In step S101, the filtering coefficient classification unit 130 extracts, for each block in an image one frame before the target image for encoding, a decoded image which has been encoded and corresponds to an image one frame before the target image for encoding from the decoded image memory 144. The image one frame before the target image for encoding has been divided into a plurality of blocks and encoded. The filtering coefficient classification unit 130 extracts, as for a block in an image one frame before the target image for encoding, a prediction mode (prediction direction) corresponding to the decoded image extracted from the decoded image memory 114 from the decoded image peripheral information storing unit 116. The filtering coefficients classification unit 130 extracts, as for a block in an image one frame before the target image for encoding, the original image corresponding to the decoded image extracted from the decoded image memory 114 from the original image memory 118. The filtering coefficient classification unit 130 associates, as for a block in an image one frame before the target image for encoding, the decoded image extracted from the decoded image memory 114, the prediction mode extracted from the decoded image peripheral information storing unit 116 and the original image extracted from the original image memory 118. The filtering coefficient classification unit 130 calculates a filtering coefficient from a decoded image and an original image for each prediction mode. When there are decoded images and original images of a plurality of blocks for one prediction mode, the filtering coefficient classification unit 130 calculates a filtering coefficient from the mean of the decoded images and the mean of the original images. Specific methods for calculating the filtering coefficients are described later. The calculation of a filtering in step S101 is performed on a frame to frame basis.

In step S102, the filtering coefficient selecting unit 140 reads out the prediction modes (prediction directions) of the peripheral blocks of the target block for encoding from the encoding target block peripheral information readout unit 120. The peripheral blocks of the target block for encoding have been encoded. The filtering coefficient selecting unit 140 selects a filtering coefficient for the same prediction mode (prediction direction) as the prediction mode (prediction direction) which has been read out among the filtering coefficients calculated by the filtering coefficient classification unit 130, and outputs the selected filtering coefficient to the original image correcting unit 142. Specific methods of selecting filtering coefficients are described later.

In step S103, the original image correcting unit 142 applies a filter to the peripheral target pixels for filtering of the target block for encoding in the target image for encoding by using the filtering coefficients selected by the filtering coefficient selecting unit 140. The target pixels for filtering are pixels which are in the peripheral blocks of the target block for encoding in the target image for encoding and adjacent to the target block for encoding.

The original image correcting unit 142 outputs the filtered target pixels for filtering as reference pixels to the reference image generating unit 144. The reference image generating unit 144 generates a reference image for intra prediction mode determination based on the reference pixels output by the original image correcting unit 142 and outputs the generated reference image to the intra prediction mode determination unit 146. The reference images for intra prediction mode determination are the images in which the target pixels for filtering are the reference pixels generated by the original image correcting unit 142.

Figure 10:
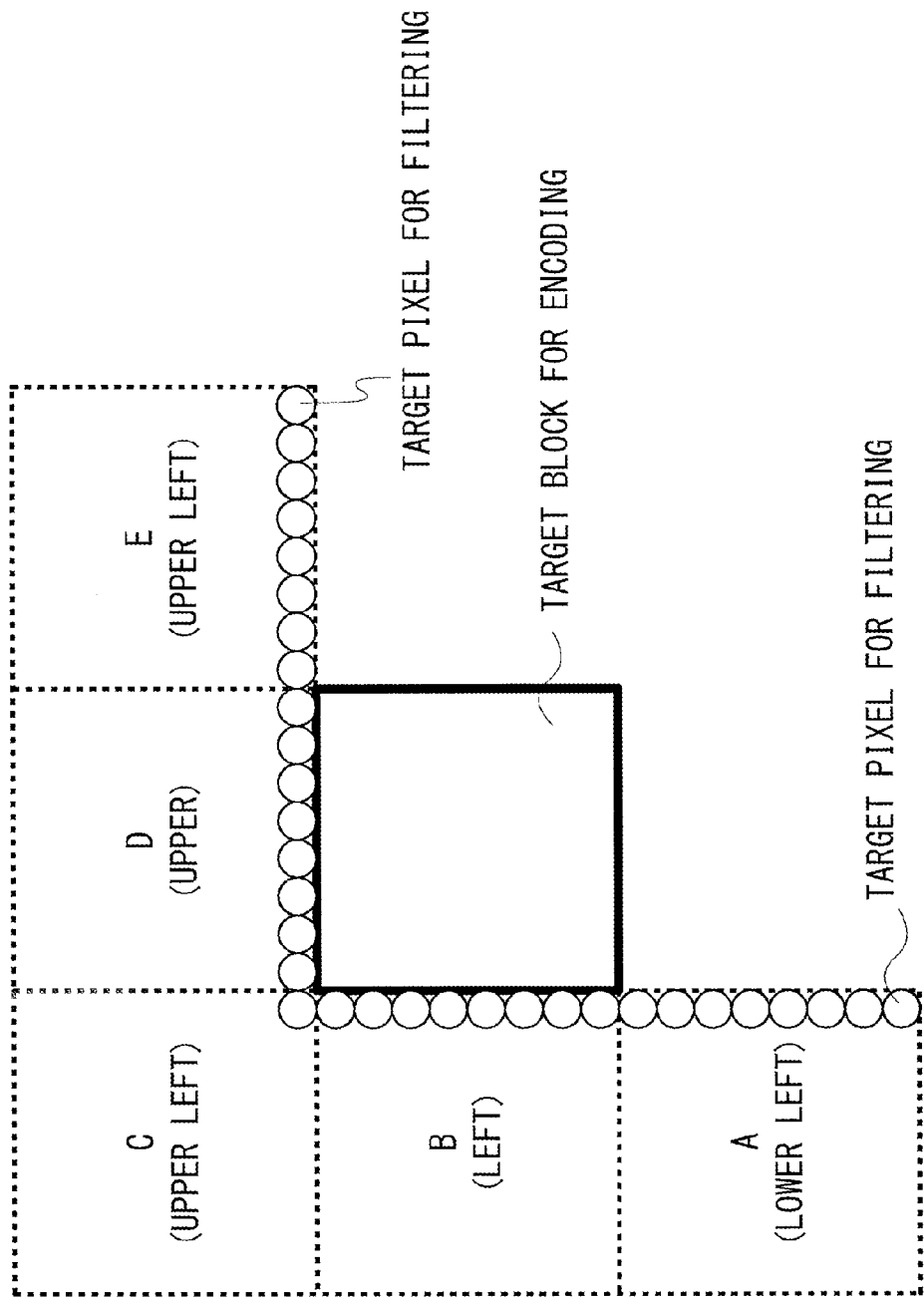
FIG. 10 is a diagram illustrating an example of the locations of target pixels for a filtering process.

FIG. 10 is a diagram illustrating the locations of the target pixels for filtering. In HEVC, for example, as illustrated in FIG. 10, the target pixels for filtering are 33 pixels which are 8 pixels in the lower left block A, 8 pixels in the left block B, 1 pixel in the upper left block C, 8 pixels in the upper block D and 8 pixels in the upper right block E, which are adjacent to the target block for encoding in the 8×8 (8 pixels×8 pixels) target block for encoding. The target pixels for filtering are reference pixels for the target block for encoding.

When the size of the target block for encoding is other than 8×8, the target pixels for filtering are selected as described above. The number of pixels of the target pixels for filtering depends on the size of the target block for encoding. When the size of the target block for encoding is n×n, the number of pixels of the target pixels for filtering is 4×n+1. For example, when the size of the target block for encoding is 4×4, the number of pixels of the target pixels for filtering is 17 (=4× 4+1).

Referring to FIG. 9, in step S104, the intra prediction mode determination unit 146 uses the reference images output by the reference image generating unit 144 to generate a prediction image of the target block for encoding for each prediction mode and determines an appropriate prediction mode.

When the intra prediction mode determination unit 146 determines the appropriate prediction mode, the intra prediction mode determination unit 146 firstly sets a fixed value for the block size and determines the appropriate prediction mode (prediction direction). The intra prediction mode determination unit 146 calculates the sum of absolute values of differences (SAD) between the prediction images for the target block for encoding obtained in the reference images for the intra prediction mode determination and each prediction mode (prediction direction) and the original image of the target block for encoding and selects the prediction direction in which the value of the SAD becomes minimum. N denotes the number of predetermined prediction modes (prediction directions).

Here, the value of the SAD in the prediction mode (prediction direction) j (j=1, ..., N) is referred to as SADj. When the minimum value among SAD1 to SADN is SADk, the intra prediction mode determination unit 146 selects the prediction mode (prediction direction) k as an appropriate prediction mode (prediction direction).

Next, the intra prediction mode determination unit 146 divides the target block for encoding with a predetermined block size. For example, in HEVC, the predetermined block size is 4×4, 8×8, 16×16, 32×32 or 64×64. The intra prediction mode determination unit 146 generates a prediction image of the target block for encoding for a block with each block size by using a reference image and the selected appropriate prediction mode (prediction direction) to generate a prediction image of the target block for encoding and calculates the sum of absolute values of differences SAD between the prediction images and the original image. The intra prediction mode determination unit 146 selects the block size with which the SAD becomes minimum.

In addition, the intra prediction mode determination unit 146 associates the selected appropriate prediction mode (prediction direction) with the target block for encoding and outputs the associated information to the encoding target block peripheral information readout unit 120 and the decoded image peripheral information storing unit 116. The information of the target block for encoding includes the information of the location of the target block for encoding in the frame and the block size of the target block for encoding and the like.

In step S105, the intra prediction image generating unit 102 uses the reference image for the intra prediction mode determination and the prediction mode output by the intra prediction mode determination unit 146 to generate a prediction image of the target block for encoding. The difference image generating unit 104 generates a difference image between the original image of the target block for encoding and the prediction image generated by the intra prediction image generating unit 102 and outputs the generated difference image to the orthogonal transformation and quantization unit 106.

In step S106, the orthogonal transformation and quantization unit 106 performs an orthogonal transformation to the difference image output by the difference image generating unit 104 and generates frequency signals. The orthogonal transformation and quantization unit 106 performs a quantization process to the generated frequency signals.

In step S107, the entropy encoding unit 108 performs entropy encoding (variable-length encoding) to the quantization signals output by the orthogonal transformation and quantization unit 106 and outputs the resultant signals by stream output. The entropy encoding is a process for assigning a variable-length code according to the frequency of occurrence of a symbol.

In step S108, the inverse quantization and inverse orthogonal transformation unit 110 performs an inverse quantization to the signals output by the orthogonal transformation and quantization unit 106 to convert the signals to frequency signals and performs an inverse transformation of the orthogonal transformation to the frequency signals to generate difference image signals which have been decoded. The inverse quantization and inverse orthogonal transformation unit 110 outputs the generated difference image signals to the decoded image generating unit 112. The decoded image generating unit 112 adds the block data of the prediction image output by the intra prediction image generating unit 102 to the difference image signals output by the inverse quantization and inverse orthogonal transformation unit 110 to generate pixel data (data of the decoded image) of the block data which have been decoded. The decoded image generating unit 112 outputs the generated pixel data to the decoded image memory 114. The decoded image memory 114 stores the pixel data output by the decoded image generating unit 112 as the data of a new reference image and provides the pixel data for the intra prediction image generating unit 102 and the filtering coefficient classification unit 130.

<Method of Calculating Filtering Coefficients>

The method of calculating filtering coefficients is described below. The image one frame before the target image for encoding has been encoded on the basis of a block. Here, one block in the image one frame before the target image for encoding is referred to as a target block for processing.

Figure 11:
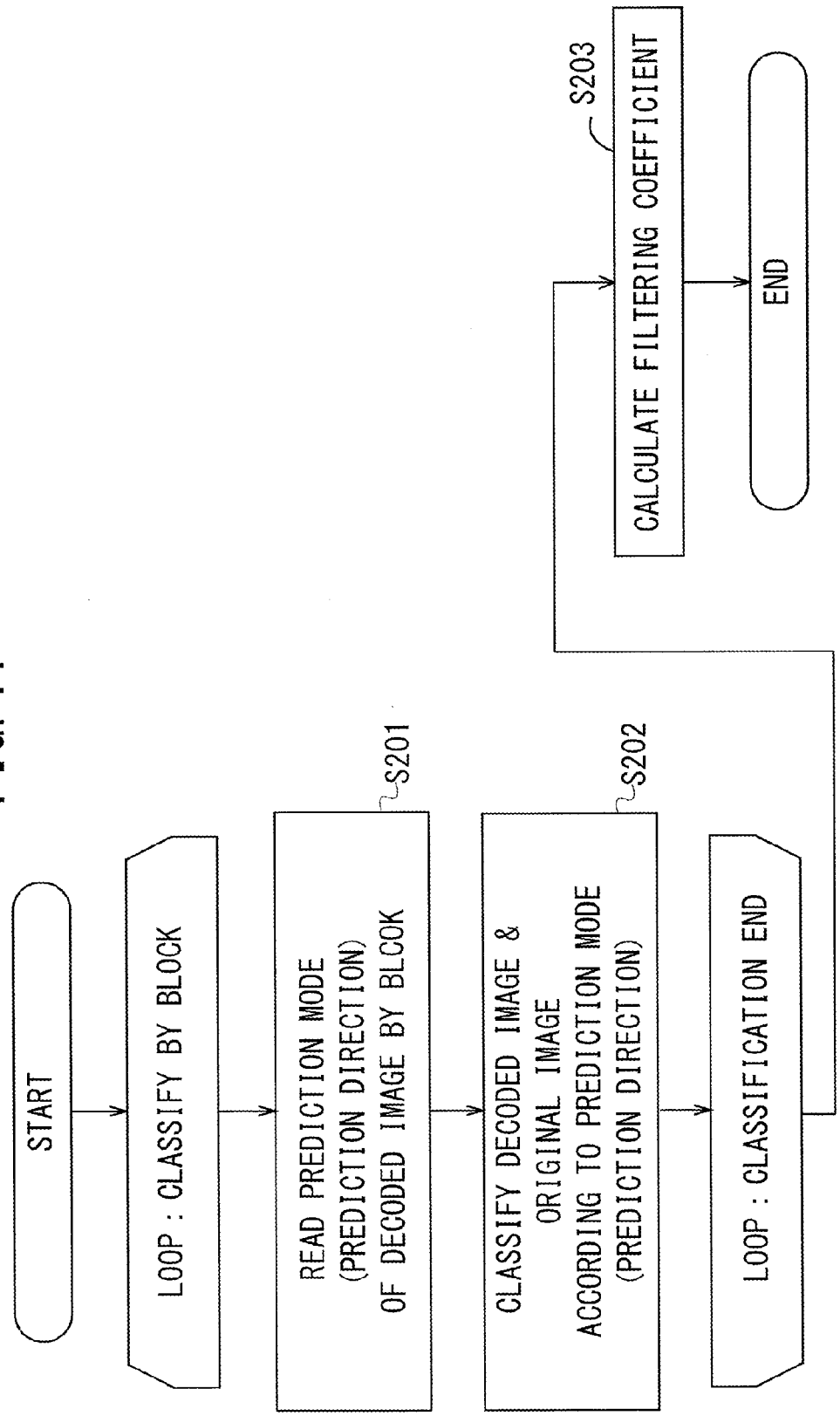
FIG. 11 is a diagram illustrating an example of an operation flow of a filtering coefficient calculation method.

FIG. 11 is a diagram illustrating an example of an operation flow of the method of calculating filtering coefficients. In step S201, the filtering coefficient classification unit 130 reads out from the decoded image peripheral information storing unit 116 for each target block for processing the prediction mode (prediction direction) of the block which includes the reference pixels on a target block for processing in the image one frame before the target image for encoding. The filtering coefficient classification unit 130 extracts from the decoded image memory 114 the decoded image of the block which includes the reference pixels on the target block for processing in the image one frame before the target image for encoding. The filtering coefficient classification unit 130 extracts from the original image memory 118 the original image of the block which includes the reference pixels on the target block for processing in the image one frame before the target image for encoding.

In addition, the filtering coefficient classification unit 130 reads out from the decoded image peripheral information storing unit 116 the prediction mode (prediction direction) of the block which includes the reference pixels to the left of the target block for processing in the image one frame before the target image for encoding. The filtering coefficient classification unit 130 extracts from the decoded image memory 114 the decoded image of the block which includes the reference pixels to the left of the target block for processing in the image one frame before the target image for encoding. The filtering classification unit 130 extracts from the original image memory 118 the original image of the block which includes the reference pixels to the left of the target block for processing in the image one frame before the target image for encoding.

Namely, in step S201, the decoded image, the original image and the prediction mode (prediction direction) of the block which includes the reference pixels of the target block for processing in the image one frame before the target image for encoding are extracted.

In step S202, the filtering coefficient classification unit 130 classifies the decoded image and the original image of the block which includes the reference pixels according to the prediction mode of the block which includes the reference pixels and stores the classified images. That is, the filtering coefficient classification unit 130 associates the prediction mode, the decoded image and the original image together, classifies the images according to the prediction mode and stores the classified images. For example, when the prediction mode is a prediction mode i, which means that the prediction direction is a prediction direction i, the filtering coefficient classification unit 130 stores the decoded image and the original image in the ith filtering coefficient classification unit 130-$i$. The ith filtering coefficient classification unit 130-$i$ is associated with the prediction mode i. The prediction mode is also referred to as intra prediction mode.

When prediction directions are used as the prediction modes, the reference pixels may be divided to the pixels (reference pixels) on one row on the upper side of the target block for encoding and the pixels (reference pixels) on one column to the left of the target block for encoding and the filtering may be performed to each divided group of reference pixels.

Figure 12:
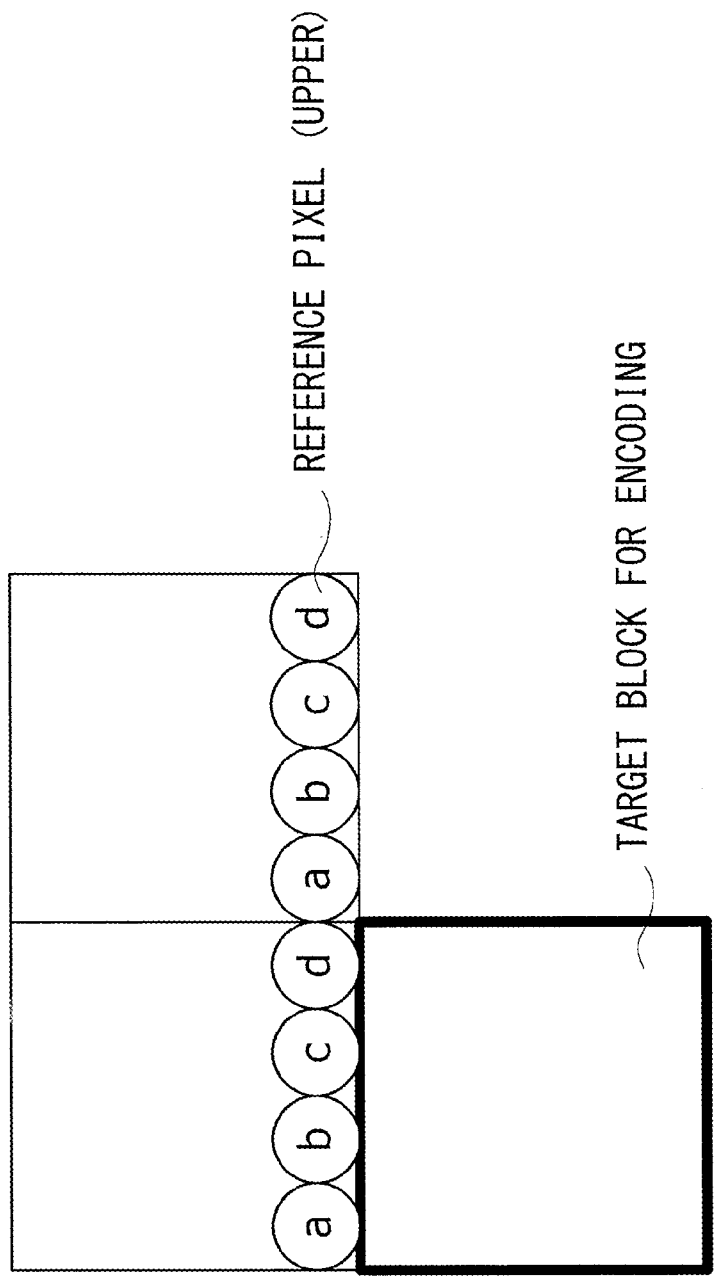
FIG. 12 is a diagram illustrating an example of peripheral pixels (upper side) of a 4×4 pixel target block for processing.

FIG. 12 is a diagram illustrating an example of reference pixels (upper side) on the peripheral areas of a 4×4 target block for processing. The characters "a", "b", "c" and "d" in FIG. 12 denote reference pixels on one row on the upper side of the target block for processing. In the example in FIG. 12, the block on the upper side of the target block for processing (the block which includes the reference pixels (upper side)) is a 4×4 block.

When the block size of the peripheral blocks of a target block for processing is 4×4, the decoded pixels $Recon_i$ [4] which correspond to the locations of the reference pixels (a, b, c and d in FIG. 12) and the original pixels $Org_i$ [4] which correspond to the locations of the reference pixels (a, b, c and d in FIG. 12) are associated with a prediction direction and classified. The decoded pixels $Recon_i$ [4] denote an mean value of the decoded pixels of the 4×4 block of which the prediction direction is i. [4] denotes a 4×4 block. The original pixels $Org_i$ [4] denote an mean value of the original pixels of the 4×4 block of which the prediction direction is i.

The decoded pixels $Recon_i$ [4] are expressed as follows.

$$Recon_i[4] = \frac{\sum_{k=1}^{N_i} recon_{i,k}[4]}{N_i}$$ [Math. 1]

$$Recon_i[4] = [Ar_i, Br_i, Cr_i, Dr_i]$$

$$recon_{i,k}[4] = [ar_{i,k}, br_{i,k}, cr_{i,k}, dr_{i,k}]$$

$recon_{i,k}[4]$ denotes the pixel values of the decoded pixels in the kth block (4×4) among the blocks (4×4) of which the prediction directions are i. $N_i$ denotes the number of 4×4 blocks of which the prediction directions are i. $Ar_i$, $Br_i$, $Cr_i$ and $Dr_i$ respectively denote the mean value of the decoded pixels on the location indicated by a, b, c and d in FIG. 12. $ar_{i,k}$, $br_{i,k}$, $cr_{i,k}$, $dr_{i,k}$ respectively denote the pixel value of the decoded pixel located on a, b, c and d in FIG. 12 in the kth block.

The original pixels $Org_i$ [4] are expressed as follows.

$$Org_i[4] = \frac{\sum_{k=1}^{N_i} org_{i,k}[4]}{N_i}$$ [Math. 2]

$$Org_i[4] = [Ao_i, Bo_i, Co_i, Do_i]$$

$$org_{i,k}[4] = [ao_{i,k}, bo_{i,k}, co_{i,k}, do_{i,k}]$$

$org_{i,k}[4]$ denotes the pixel values of the original pixels in the kth block among the blocks (4×4) of which the prediction directions are i. $N_j$ denotes the number of blocks of which the prediction directions are i. $Ao_i$, $Bo_i$, $Co_i$ and $Do_i$ respectively denote the mean value of the original pixels on the location indicated by a, b, c and d in FIG. 12. $ao_{i,k}$, $bo_{i,k}$, $co_{i,k}$, $do_{i,k}$ respectively denote the pixel value of the original pixel located on a, b, c and d in FIG. 12 in the kth block.

Figure 13:
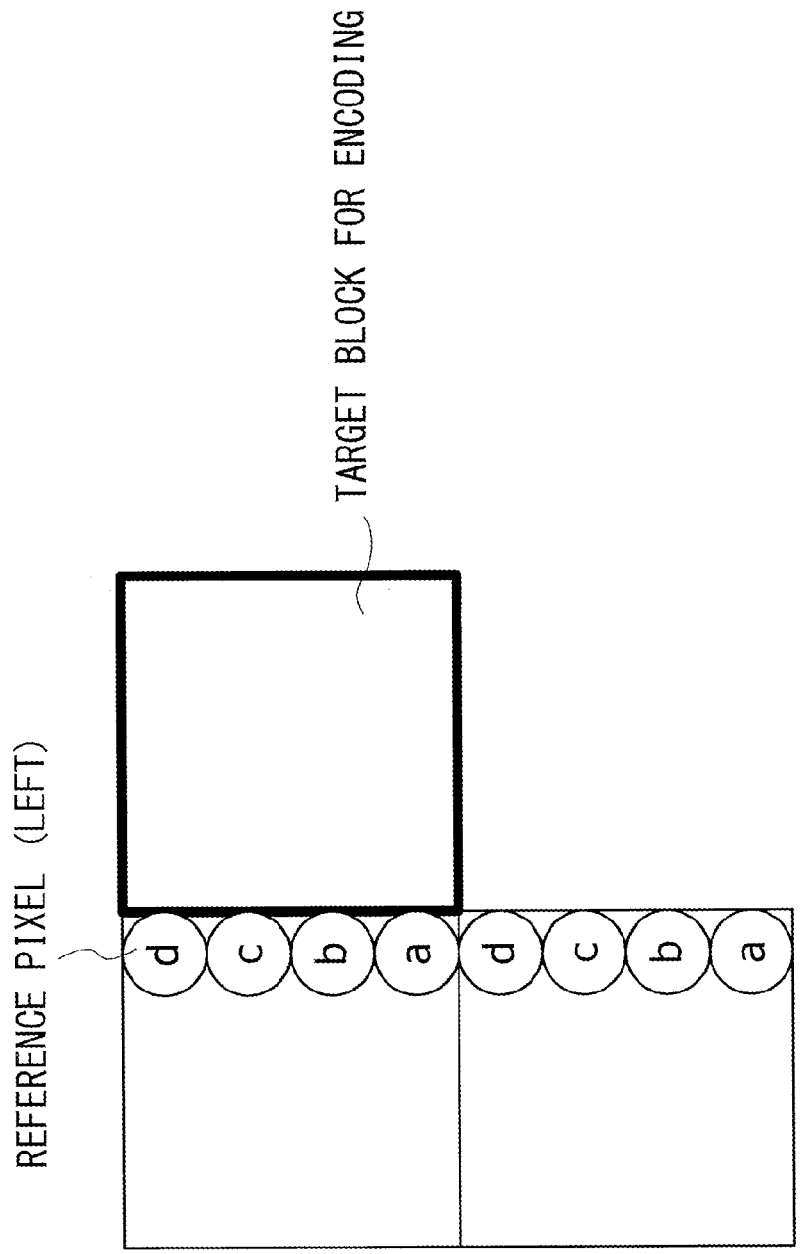
FIG. 13 is a diagram illustrating an example of peripheral pixels (left side) of a 4×4 pixel target block for processing.

FIG. 13 is a diagram illustrating an example of reference pixels (left side) on the peripheral areas of a 4×4 target block for processing. The characters "a", "b", "c" and "d" in FIG. 13 denote reference pixels on one column on the left side of the target block for processing. In the example in FIG. 13, the block on the left side of the target block for processing (the block which includes the reference pixels (left side)) is a 4×4 block.

Similar to the reference pixels on one row on the upper side of the target block for processing, the mean value of the original pixels and the mean value of the decoded pixels are calculated for each prediction direction as for the reference pixels on one column on the left side of the target block for processing.

The mean value of the reference pixels (upper side) and the mean value of the reference pixels (left side) are calculated individually or as one mean value.

FIG. 14 is a diagram illustrating an example of the classification of decoded pixels and original pixels corresponding to the locations of reference pixels in the filtering coefficient classification unit 130. In the example in FIG. 14, the reference pixels are included in a 4×4 block. In the example in FIG. 14, the decoded pixels and the original pixels corresponding to the locations of the reference pixels are classified with respect to each intra prediction mode. When the reference pixels are included in a block other than the 4×4 block, the decoded pixels and the original pixels are similarly classified with respect to each intra prediction mode. In some cases, the decoded pixels and the original pixels are classified in different manners when the locations of the reference pixels are on the upper side of the target block for processing or when the locations of the reference pixels are to the left of the target block for processing. This is because the properties of the pixels are different in some cases between the reference pixels arranged in the horizontal direction and the reference pixels arranged in the vertical direction.

Figure 15:
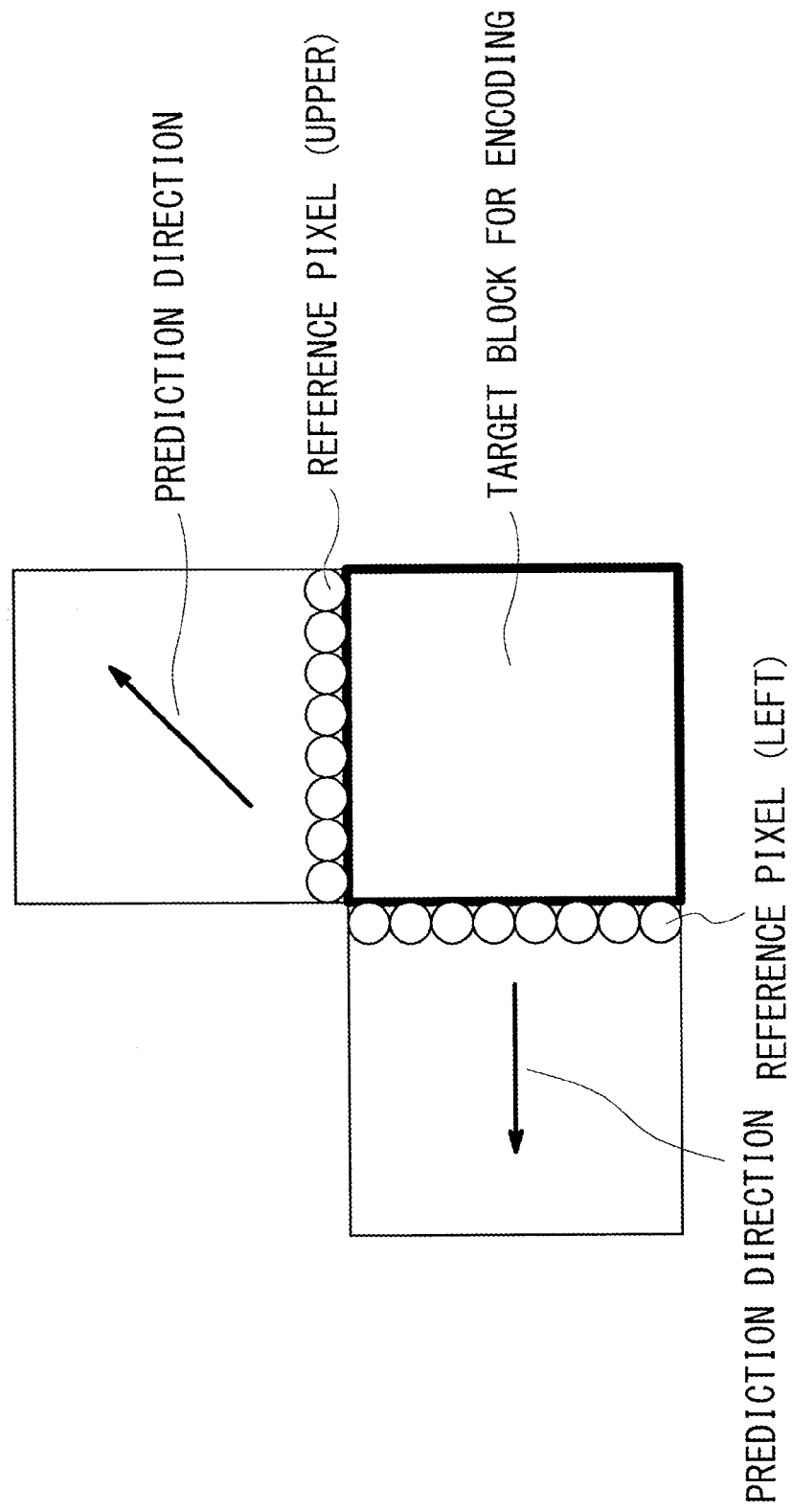
FIG. 15 is a diagram illustrating an example of a case in which the size of a target block for processing is the same as the size of the peripheral blocks.

FIG. 15 is a diagram illustrating an example in which the size of a target block for processing and the sizes of the peripheral blocks are the same.

The filtering coefficient classification unit 130 reads out the prediction directions of the peripheral blocks of the target block for processing from the decoded image peripheral information storing unit 116. The filtering coefficient classification unit 130 reads out the decoded pixels corresponding to the pixels (reference pixels) on one row adjacent to the target block for processing in the peripheral block on the upper side of the target block for processing from the decoded image memory 114. The filtering coefficient classification unit 130 reads out the original pixels corresponding to the pixels (reference pixels) on one row adjacent to the target block for processing in the peripheral block on the upper side of the target block for processing from the original image memory 118. The filtering coefficient classification unit 130 classifies the read decoded pixels and the read original pixels according to the prediction direction of the peripheral block and the size of the peripheral block.

Similarly, the filtering coefficient classification unit 130 performs the processes as described above to the peripheral block on the left side of the target block for processing.

Figure 16:
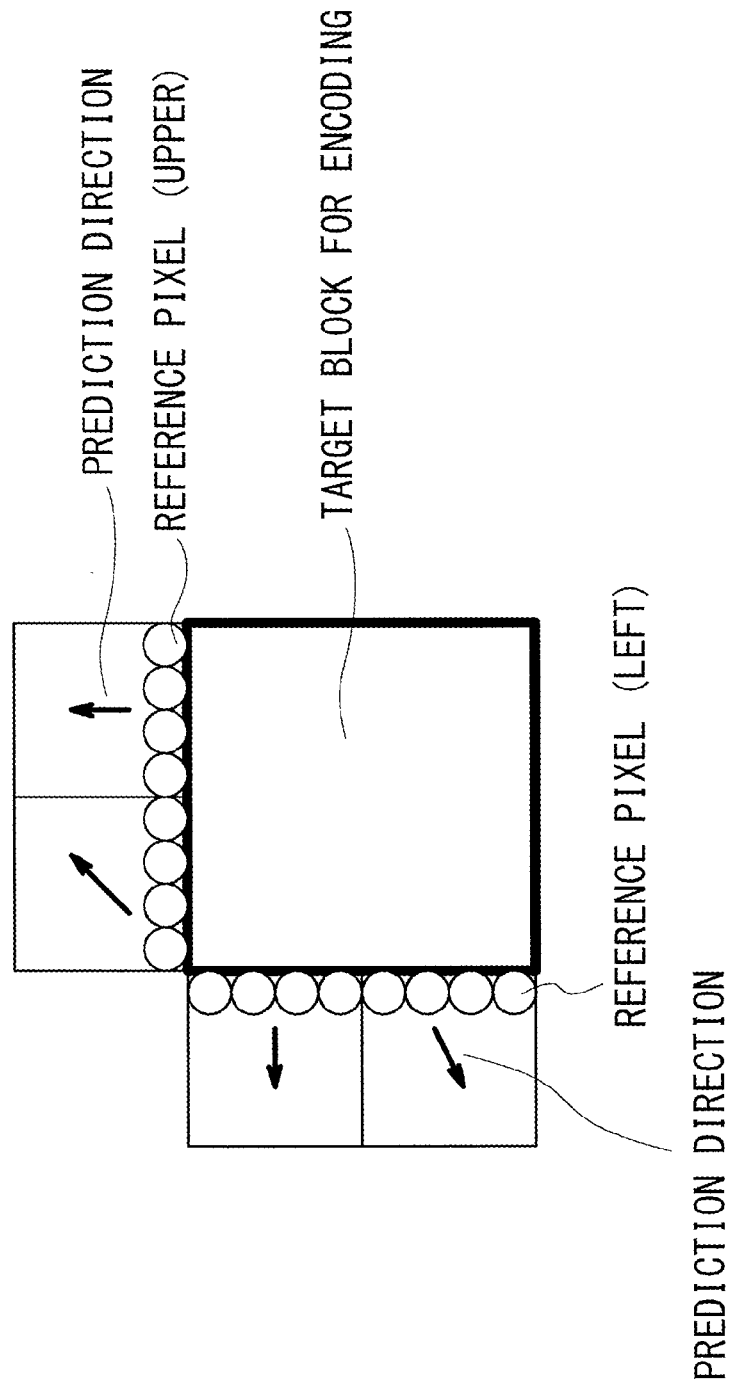
FIG. 16 is a diagram illustrating an example of a case in which the size of a target block for processing is larger than the size of the peripheral blocks.

FIG. 16 is a diagram illustrating an example in which the size of a target block for processing is larger than the sizes of the peripheral blocks.

The filtering coefficient classification unit 130 reads out block by block the prediction directions of the peripheral blocks on the upper side of the target block for processing from the decoded image peripheral information storing unit 116. The filtering coefficient classification unit 130 reads out block by block the decoded pixels corresponding to the pixels (reference pixels) on one row adjacent to the target block for processing in the peripheral blocks on the upper side of the target block for processing from the decoded image memory 114. The filtering coefficient classification unit 130 reads out block by block the original pixels corresponding to the pixels (reference pixels) on one row adjacent to the target block for processing in the peripheral blocks on the upper side of the target block for processing from the original image memory 118. The filtering coefficient classification unit 130 classifies the read decoded pixels and the read original pixels according to the prediction directions of the peripheral blocks and the sizes of the peripheral blocks.

Similarly, the filtering coefficient classification unit 130 performs the processes as described above to the peripheral blocks on the left side of the target block for processing.

Figure 17:
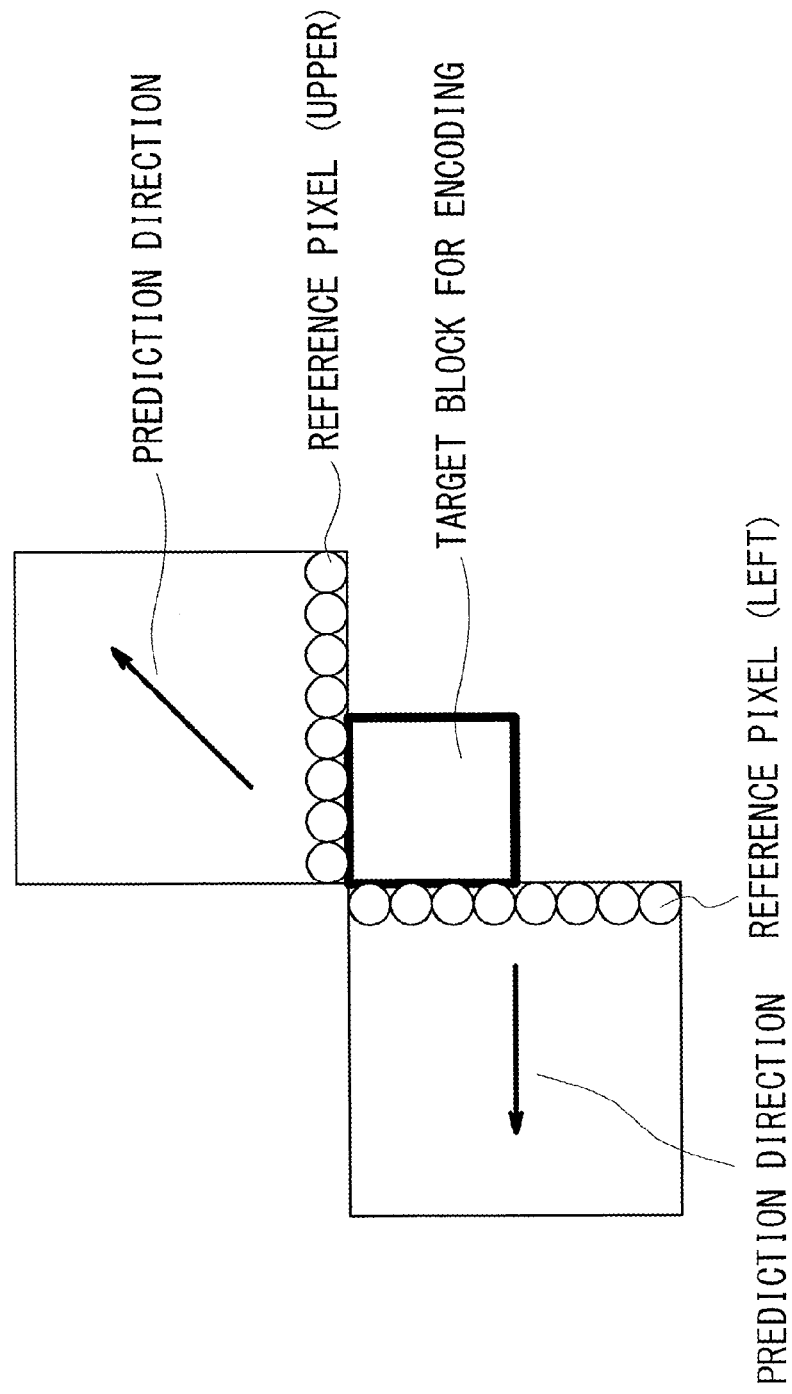
FIG. 17 is a diagram illustrating an example of a case in which the size of a target block for encoding is smaller than the size of the peripheral blocks.
Figure 18:
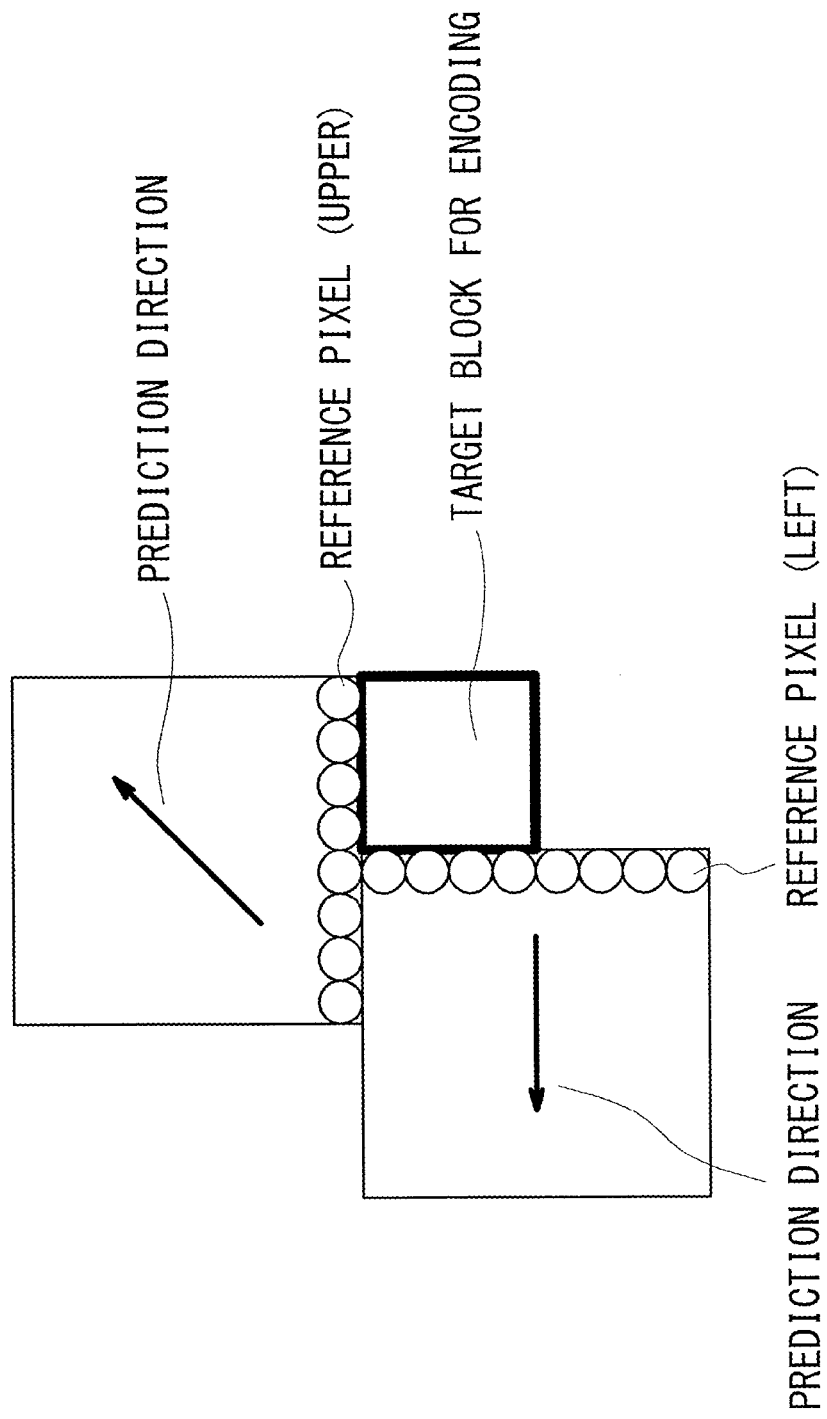
FIG. 18 is a diagram illustrating an example of a case in which the size of a target block for encoding is smaller than the size of the peripheral blocks.

FIGS. 17 and 18 are diagrams illustrating examples in which the size of a target block for processing is smaller than the sizes of the peripheral blocks.

The filtering coefficient classification unit 130 reads out the prediction direction of the peripheral block on the upper side of the target block for processing from the decoded image peripheral information storing unit 116. The filtering coefficient classification unit 130 reads out the decoded pixels corresponding to the pixels (reference pixels) on one row adjacent to the target block for processing in the peripheral block on the upper side of the target block for processing from the decoded image memory 114. The filtering coefficient classification unit 130 reads out the original pixels corresponding to the pixels (reference pixels) on one row adjacent to the target block for processing in the peripheral block on the upper side of the target block for processing from the original image memory 118. The filtering coefficient classification unit 130 classifies the read decoded pixels and the read original pixels according to the prediction direction of the peripheral block and the size of the peripheral block.

Similarly, the filtering coefficient classification unit 130 performs the processes as described above to the peripheral block on the left side of the target block for processing.

The processes of steps S201 and S202 are performed to the blocks in the image one frame before the target image for encoding. When the processes of steps S201 and S202 are completed for the blocks in the image one frame before the target image for encoding, the process proceeds to step S203.

In step S203, the filtering coefficient classification 130 calculates filtering coefficients for each of the first filtering coefficient classification unit 130-1 to the nth filtering coefficient classification unit 130-N. For example, the decoded images and the original images of blocks with the prediction mode i (prediction direction i) are stored in the ith filtering coefficient classification unit 130-$i$. The filtering coefficients are calculated with respect to each block size.

A coefficient of a Wiener Filter is an example of a filtering coefficient. The coefficient of the Wiener Filter is calculated by the following equation. The filtering coefficient as described above is not limited to the coefficient of the Wiener Filter.

$$H = R^{-1} P \quad \text{[Math. 3]}$$

Here, H denotes a coefficient of a Wiener Filter,

R denotes an autocorrelation matrix of reference pixels in an original image, and P denotes a cross-correlation matrix between reference pixels of a decoded image and reference pixels of the original image. $R^{-1}$ denotes the inverse matrix of R.

For example, when the reference pixels are four pixels and the block including the reference pixels is a 4×4 block, the matrix P is expressed as follows.

$$P = Recon_i^T[4] \times Org_i[4] = \begin{bmatrix} Ar_iAo_i & Ar_iBo_i & Ar_iCo_i & Ar_iDo_i \\ Br_iAo_i & Br_iBo_i & Br_iCo_i & Br_iDo_i \\ Cr_iAo_i & Cr_iBo_i & Cr_iCo_i & Cr_iDo_i \\ Dr_iAo_i & Dr_iBo_i & Dr_iCo_i & Dr_iDo_i \end{bmatrix} \quad \text{[Math. 4]}$$

For example, when the reference pixels are four pixels, the matrix R is expressed as follows.

$$P = Org_i^T[4] \times Org_i[4] = \begin{bmatrix} Ao_iAo_i & Ao_iBo_i & Ao_iCo_i & Ao_iDo_i \\ Bo_iAo_i & Bo_iBo_i & Bo_iCo_i & Bo_iDo_i \\ Co_iAo_i & Co_iBo_i & Co_iCo_i & Co_iDo_i \\ Do_iAo_i & Do_iBo_i & Do_iCo_i & Do_iDo_i \end{bmatrix} \quad \text{[Math. 5]}$$

When the reference pixels are not four pixels but eight pixels and the like, the filtering coefficients are calculated similarly.

(Method of Selecting Filtering Coefficients)

A method of selecting filtering coefficients is described below.

Figure 19:
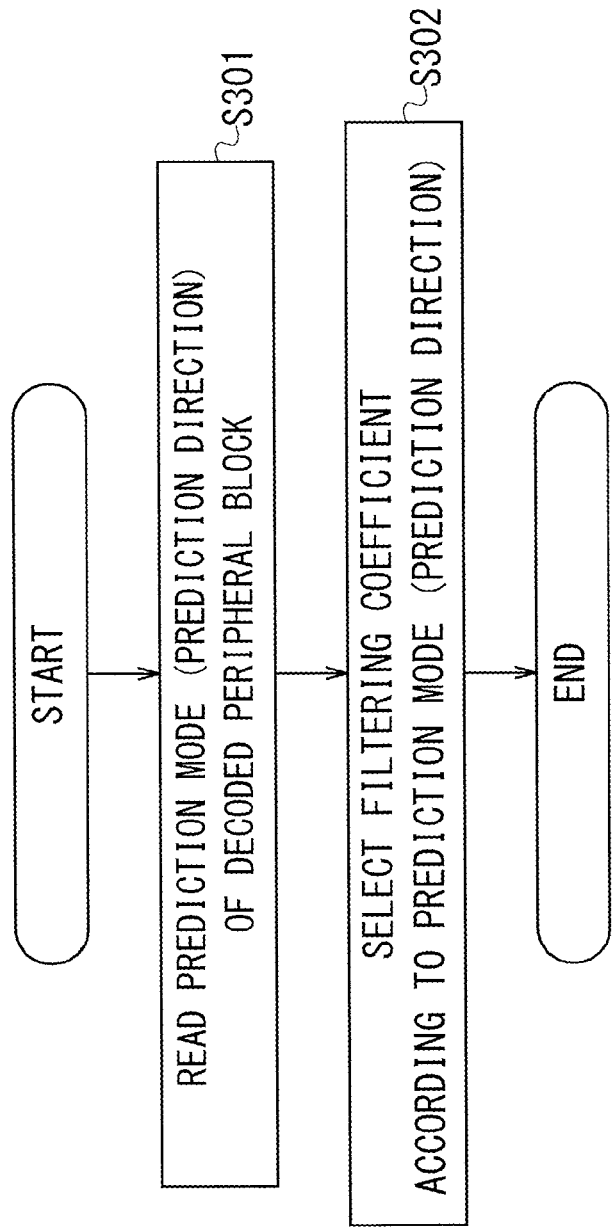
FIG. 19 is a diagram illustrating an example of an operation flow of a filtering coefficient selection method.

FIG. 19 is a diagram illustrating an example of operation flow of the method of selecting filtering coefficients. In step S301, the filtering coefficient selecting unit 140 reads out the prediction modes and the block sizes of the peripheral blocks of the target block for encoding from the encoding target block peripheral information readout unit 120. The peripheral blocks of the target block for encoding have been encoded. Therefore, the prediction modes of the peripheral blocks of the target block for encoding have been determined by the intra prediction mode determination unit 146. Here, the peripheral blocks of the target block for encoding are blocks which include target pixels for filtering (see FIG. 10).

In step S302, the filtering coefficient selecting unit 140 selects a filtering coefficient for each peripheral block from the filtering coefficient classification unit 130 based on the prediction modes and the block sizes read out from the encoding target block peripheral information readout unit 120.

The filtering coefficient selecting unit 140 extracts block by block the filtering coefficient calculated by the filtering coefficient classification unit 130 based on the prediction mode and the block size of the peripheral block in which the reference pixels for the target block for encoding are included. The original image correcting unit 142 performs a filtering process to the target pixels for filtering of the peripheral blocks by using the filtering coefficients extracted by the filtering coefficient selecting unit 140 to generate reference pixels.

(Functional Effects of Embodiments)

The moving image encoding apparatus 100 uses a decoded image of an image one frame before a target image for encoding to calculate a filtering coefficient. The decoded image of the image one frame before the target image for encoding is obtained by decoding the encoded data of the image one frame before the target image for encoding. The filtering coefficient is calculated for each prediction mode and each block size of the blocks. The original image correcting unit 142 of the moving image encoding apparatus 100 multiplies the calculated filtering coefficient by the original pixels used for the intra prediction mode determination to generate reference pixels which are similar to the decoded pixels of the target image for encoding. The moving image encoding unit 100 uses the generated reference pixels to select the prediction mode for the target block for encoding. When the reference pixels similar to the decoded pixels of the target image for encoding to select the target block for encoding, the accuracy of the intra prediction mode is improved and the quality of the encoded image is also improved.

The moving image encoding apparatus 100 uses the pseudo pixels of the decoded image of the target image for encoding (reference pixels for intra prediction mode determination) to determine the intra prediction mode of the target image for encoding. The moving image encoding apparatus 100 performs the intra prediction mode determination without obtaining the decoded image of the encoded data of the target image for encoding. Therefore, the moving image encoding apparatus 100 performs the intra prediction mode determination for the target image for encoding without performing the inverse quantization and the inverse orthogonal transformation (decoding processes) and the like for obtaining the decoded image of the encoded data of the target image for encoding. Also, the moving image encoding apparatus 100 obtains the pseudo pixels of the decoded image of the target image for encoding and performs the intra prediction mode determination for the target image for encoding without waiting for the completions of the inverse quantization and the inverse orthogonal transformation and the like for obtaining the decoded image of the encoded data of the target image for encoding. Thus, since the moving image encoding apparatus 100 does not wait for the completions of the inverse quantization and the inverse orthogonal transformation and the like for obtaining the decoded image of the encoded data of the target image for encoding, the acceleration of the encoding processes is achieved. Since the moving image encoding apparatus 100 uses the pseudo pixels of the decoded image of the target image for encoding to determine the intra prediction mode, a higher accuracy encoding than a case of using the pixels of the original image is achieved. The moving image encoding apparatus 100 is capable of performing a parallel processing of the intra prediction mode determination of the target image for encoding, the inverse quantization of the target image for encoding and the inverse orthogonal transformation of the target image for encoding.

The intra prediction modes of the peripheral block of the target block for encoding are obtained when the peripheral blocks are encoded. The moving image encoding apparatus 100 uses the intra prediction modes of the peripheral blocks of the target block for encoding and the filtering coefficients obtained from the image one frame before the target image for encoding and the like to generate an intra prediction image.

<Variation 1>

Next, Variation 1 is described below. Variation 1 includes common features with the above embodiment. Therefore, the differences are mainly described and the descriptions of the common features are omitted here.

Figure 20:
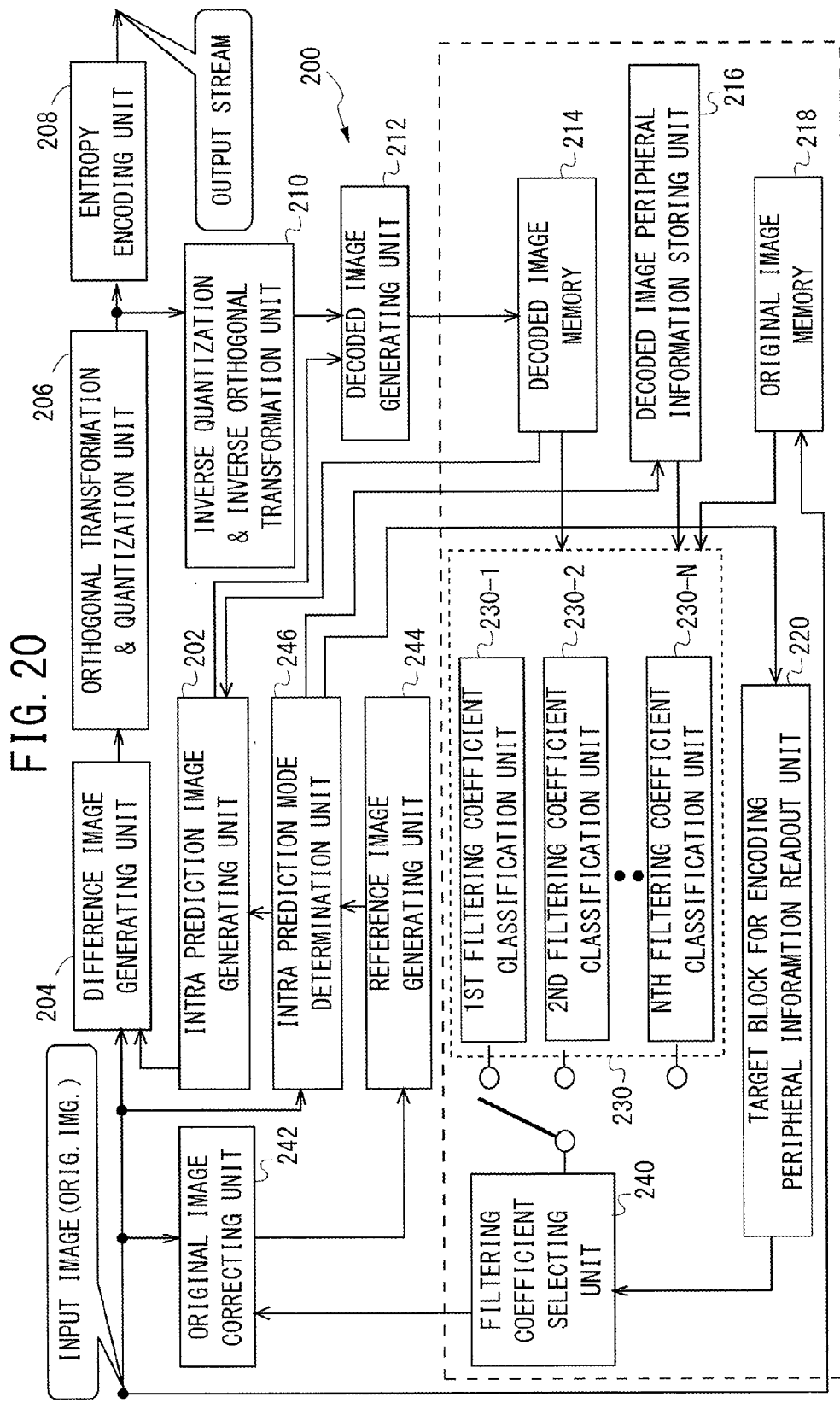
FIG. 20 is a diagram illustrating an example of a moving image encoding apparatus in Variation 1.

FIG. 20 is a diagram illustrating a moving image encoding apparatus in Variation 1. The moving image encoding apparatus 200 includes an intra prediction image generating unit 202, a difference image generating unit 204, an orthogonal transformation and quantization unit 206, an entropy encoding unit 208, an inverse quantization and inverse orthogonal transformation unit 210, a decoded image generating unit 212 and a decoded image memory 214. In addition, the moving image encoding apparatus 200 includes a decoded image peripheral information storing unit 216, an original image memory 218, an encoding target block peripheral information readout unit 220, a filtering coefficient classification unit 230 and a filtering coefficient selecting unit 240. Further, the moving image encoding apparatus 200 includes an original pixel correcting unit 242, a reference image generating unit 244 and an intra prediction mode determination unit 246.

The moving image encoding apparatus 100 in the above embodiment uses the intra prediction modes (prediction directions) as classification items for calculating the filtering coefficients. The moving image encoding apparatus 200 in Variation 1 uses the variances of reference pixels as the classification items for calculating the filtering coefficients.

The decoded image peripheral information storing unit 216 stores the variance of the reference pixels for each block as for the decoded image of the image one frame before the target image for encoding. The decoded image peripheral information storing unit 216 outputs the variances of the reference pixels in response to a request from the filtering coefficient classification unit 230. The variance of the reference pixels for each block is calculated by the intra prediction mode determination unit 246 and stored in the decoded image peripheral information storing unit 216.

FIG. 21 is a diagram illustrating an example of the classification of the decoded pixels and the original pixels corresponding to the locations of reference pixels. The example in FIG. 21 is a case in which the reference pixels are included in a 4×4 block. Here, for example, the variance of the reference pixels is classified into Group 1 when the variance of the reference pixels is higher than or equal to a threshold Th. The variance of the reference pixels is classified into Group 0 when the variance of the reference pixels is lower than the threshold Th. The variance of the reference pixels may be classified into three groups by using more than one threshold. In the example in FIG. 21, the corresponding decoded pixels and the corresponding original pixels are classified according to the group of the variance of the reference pixels. In a case that the reference pixels are included in a block other than the 4×4 block, the corresponding decoded pixels and the original pixels are similarly classified according to the group of the variance of the reference pixels. The decoded pixels and the original pixels are classified in different manners when the locations of the reference pixels are on the upper side of the target block for processing or when the locations of the reference pixels are to the left of the target block for processing. This is because the properties of the pixels are different in some cases between the reference pixels arranged in the horizontal direction and the reference pixels arranged in the vertical direction.

The filtering coefficient classification unit 230 calculates a filtering coefficient for each variance group. The encoding target block peripheral information readout unit 220 calculates and stores the variance of the reference pixels in a peripheral area of each block.

The filtering coefficient classification unit 230 includes N filtering coefficient classification units (the first filtering coefficient classification 230-1, . . . , Nth filtering coefficient classification 230-N). N denotes the number of groups of variance of reference pixels. The filtering coefficient classification unit 230 reads out the variance of the reference pixels in the peripheral block in which the reference pixels for intra prediction mode determination of the target block for processing are included from the decoded image peripheral information storing unit 216. The filtering coefficient classification unit 230 reads out the decoded pixels and the original pixels of the reference pixels for intra prediction mode determination for each read variance of reference pixels and calculates a filtering coefficient from the decodedpixels and the original pixels for each variance group. The filtering coefficient classification unit 230 takes advantage of the temporal correlations of moving images to use the data of the decoded image of the picture one frame before the picture which is currently being encoded retrieved from the decoded image memory 214 and the data of the original image retrieved from the original image memory 218 to calculate a filtering coefficient.

(Functional Effects of Variation 1)

When the variance of reference pixels is large, the reference pixels are considerably different from each other. And when frequency conversions are applied to the reference pixels, the reference pixels are homogeneously distributed in a range from the low frequency area to the high frequency area. Therefore, when the variance of reference pixels is large, a strong filter is applied. In addition, when the variance of reference pixels is small, the reference pixels are slightly different from each other. And when frequency conversions are applied to the reference pixels, the reference pixels converge on the low frequency area. Therefore, when the variance of reference pixels is small, a weak filter is applied. Thus, the filtering coefficients are changed according to the variances of reference pixels so that encoding with a higher accuracy is achieved.

<Variation 2>

Next, Variation 2 is described below. Variation 2 includes common features with the above embodiment and Variation 1. Therefore, the differences are mainly described and the descriptions of the common features are omitted here.

Figure 22:
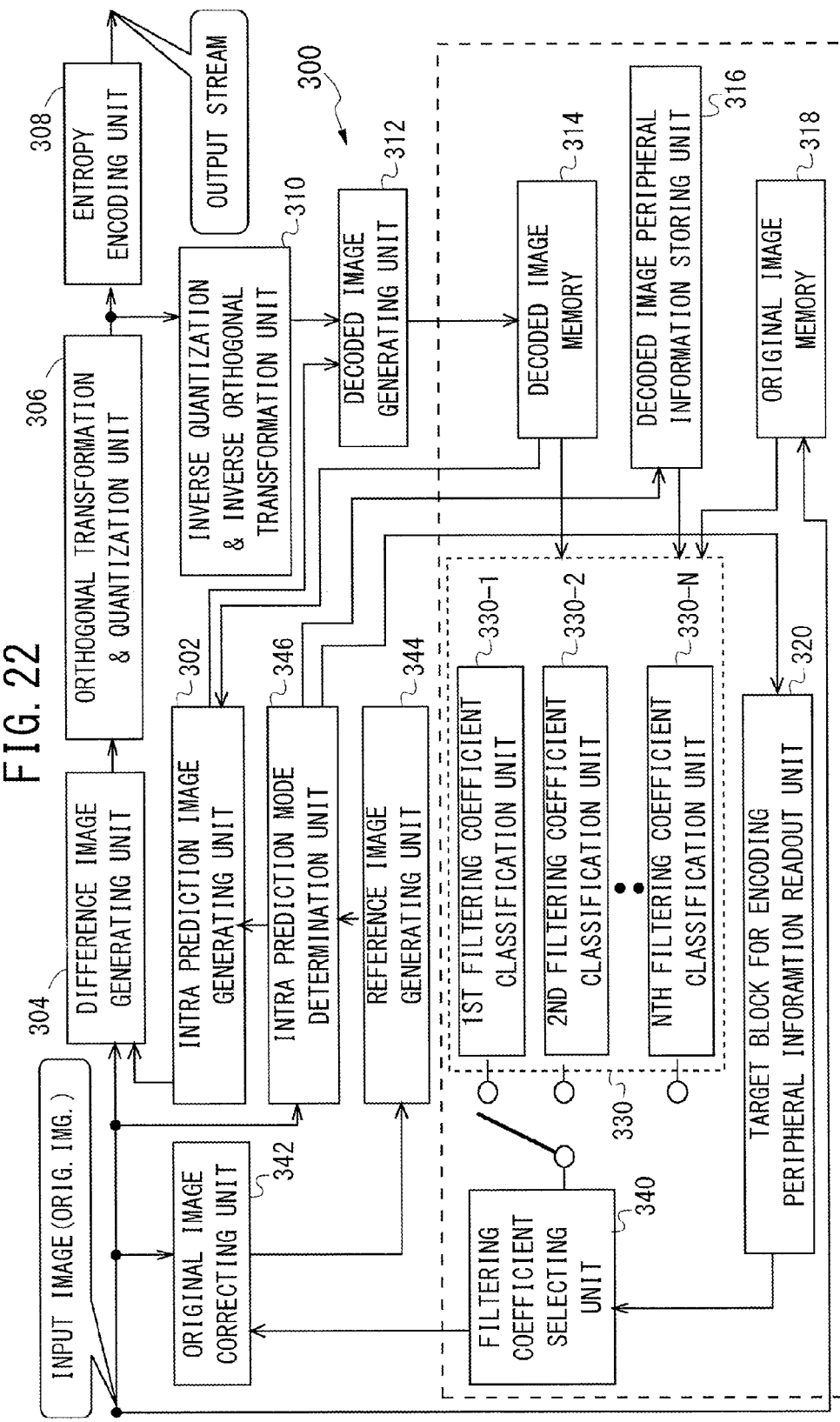
FIG. 22 is a diagram illustrating an example of a moving image encoding apparatus in Variation 2.

FIG. 22 is a diagram illustrating an example of a moving image encoding apparatus according to Variation 2. The moving image encoding apparatus 300 includes an intra prediction image generating unit 302, a difference image generating unit 304, an orthogonal transformation and quantization unit 306, an entropy encoding unit 308, an inverse quantization and inverse orthogonal transformation unit 310, a decoded image generating unit 312 and a decoded image memory 314. In addition, the moving image encoding apparatus 300 includes a decoded image peripheral information storing unit 316, an original image memory 318, an encoding target block peripheral information readout unit 320, a filtering coefficient classification unit 330 and a filtering coefficient selecting unit 340. Further, moving image encoding apparatus 300 includes an original pixel correcting unit 342, a reference image generating unit 344 and an intra prediction mode determination unit 346.

The moving image encoding apparatus 100 in the above embodiment uses the intra prediction modes (prediction directions) as classification items for calculating the filtering coefficients. The moving image encoding apparatus 300 in Variation 2 uses the edge directions of reference pixels as the classification items for calculating the filtering coefficients.

The decoded image peripheral information storing unit 316 stores the edge directions of the reference pixels for each block as for the decoded image of the image one frame before the target image for encoding. The decoded image peripheral information storing unit 316 outputs the edge directions of the reference pixels in response to a request from the filtering coefficient classification unit 330. The edge directions of the reference pixels for each block are calculated by the intra prediction mode determination unit 346 and stored in the decoded image peripheral information storing unit 316.

(Method of Calculating Edge Directions)

The method of calculating the edge directions is described below. The edge directions are calculated by the intra prediction mode determination unit 346. The edge directions may be calculated by a processing unit other than the intra prediction mode determination unit 346.

Figure 23:
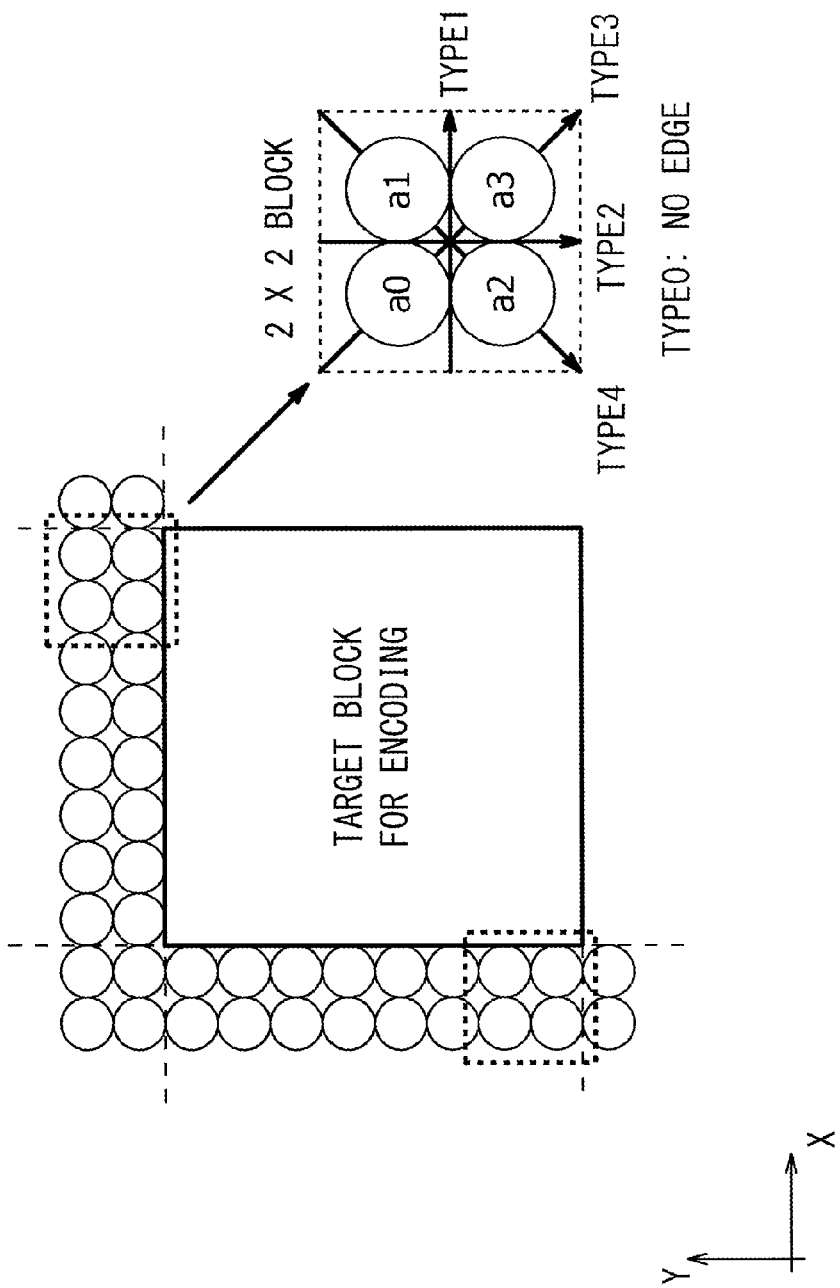
FIG. 23 is a diagram illustrating an example of a 2×2 pixel block including reference pixels in a peripheral block of a target block for encoding which are used for calculating an edge direction.

FIG. 23 is a diagram illustrating an example of a 2×2 block used for calculating the edge directions which includes the reference pixels in a peripheral block of the target block for encoding. In FIG. 23, a 2×2 block (for example, the part enclosed with a dotted square) which includes the reference pixels adjacent to the target block for encoding is the block used for calculating the edge directions. The 2×2 block does not include the pixels in the target block for encoding.

The intra prediction mode determination unit 346 calculates the edge strength ∇f of each 2×2 peripheral block of the target block for encoding. The edge strength ∇f is expressed as follows.

$$\nabla f = \sqrt{d_x^2 + d_y^2} \qquad \text{[Math. 6]}$$

Here, dx and dy respectively denote the gradient in the x-axis direction and the gradient in the y-axis direction. dx and dy are expressed as follows.

$$d_x = -(a_0+a_2)+(a_1+a_3)$$

$$d_y = -(a_0+a_1)+(a_2+a_3) \qquad \text{[Math. 7]}$$

a0, a1, a2 and a3 each denotes a pixel in a 2×2 block as illustrated in FIG. 23. The edge direction θ(x, y) is expressed as follows.

$$\theta(x, y) = \arctan\left(\frac{d_y}{d_x}\right) \qquad \text{[Math. 8]}$$

The edge direction is classified into one of five types of edge directions as illustrated in FIG. 23. When the edge strength ∇f is smaller than a predetermined threshold, it is determined that there is no edge (type 0). When the edge strength ∇f is higher than or equal to the predetermined threshold, the edge type is classified into one of four types of edge directions according to the edge direction θ. For example, when no variation is in the x-axis direction and a variation is in the y-axis direction in a block, the type of edge direction of the block is type 2. And when a variation is in the x-axis direction and no variation is in the y-axis direction in a block, the type of edge direction of the block is type 1.

The intra prediction mode determination unit 346 calculates in turn the edge strength and the edge direction by using pixels on the two peripheral rows or columns including reference pixels and shifting pixel by pixel in each 2×2 block. The calculated edge directions are stored in the decoded image peripheral information storing unit 316 on a 2×2 block basis. In one image, the edge directions are calculated for the 2×2 blocks which include peripheral reference pixels of the target block.

(Method of Calculating Filtering Coefficients)

A method of calculating filtering coefficients is described below. The image one frame before the target image for encoding has already been encoded on a block basis. The edge directions calculated for the image one frame before the target image for encoding are stored in the decoded image peripheral information storing unit 316 on a 2×2 block basis. Here, reference pixels are target pixels for correction.

Figure 24:
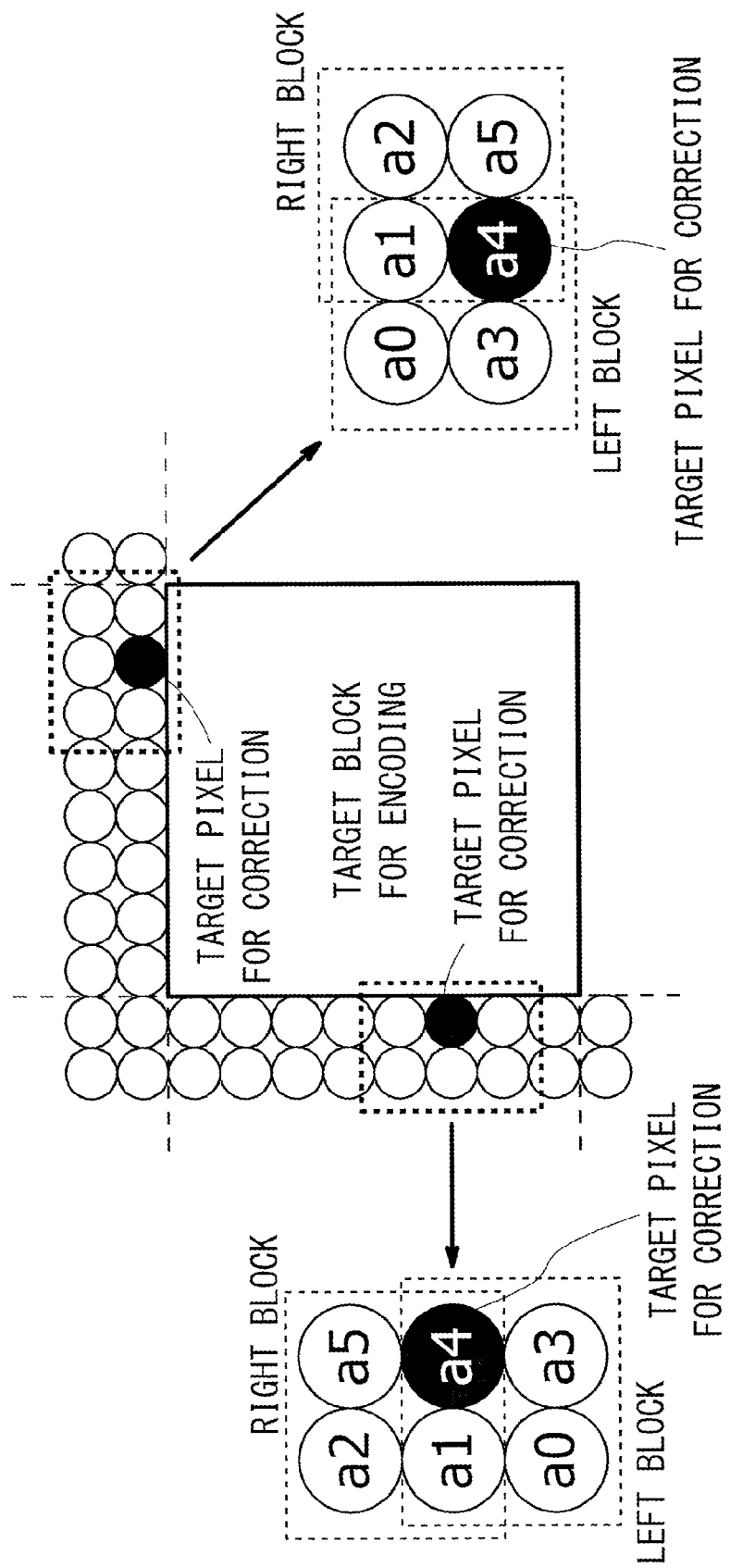
FIG. 24 is a diagram illustrating an example of a 2×2 pixel block including target pixels for correction.

FIG. 24 is a diagram illustrating an example of a 2×2 block which includes a target pixel for correction. As illustrated in FIG. 24, the target pixel for correction, for example a4 in FIG. 24, is included in the left block, for example a0, a1, a3 and a4 in FIG. 24, and in the right block, for example a1, a2, a4 and a5 in FIG. 24. As described above, when the edge direction of each block is classified into five types, there are 5×5=25 different types of edge directions for one target pixel for correction. That is, a target pixel for correction is classified in 25 ways (classified into 25 types) with reference to the edge direction of the left block and the edge direction of the right block in some cases.

The filtering coefficient classification unit 330 reads out from the decoded image peripheral information storing unit 316 the types of edge directions for each target pixel for correction in the image one frame before the target image for encoding. The filtering coefficient classification unit 330 extracts from the decoded image memory 314 a target pixel for correction, for example a4 in FIG. 24, and the peripheral pixels of the target pixel for correction, for example a0, a1, a2, a3 and a5, in the decoded image of the image one frame before the target image for encoding. The filtering coefficient classification unit 330 extracts from the original image memory 318 the target pixels for correction and the peripheral pixels of the target pixels for correction in the original image of the image one frame before the target image for encoding.

The filtering coefficient classification unit 330 classifies the decoded image and the original image of the extracted target pixels for correction and the extracted peripheral pixels of the target pixels for correction according to the types of edge directions of the target pixels for correction and stores the decoded image and the original image. That is, the filtering coefficient classification unit 330 associates the types and the decoded image and the original together, and classifies the associated types, decoded image and original image according to the types of edge directions (prediction modes) and stores the classified types, decoded image and original image. In addition, the filtering coefficient classification unit 330 may classify the decoded image and the original image according to the block size of the target block for encoding. For example, in HEVC, since the block size is one of five types, 4×4, 8×8, 16×16, 32×32 and 64×64, the filtering coefficient classification unit 330 employs the types of edge directions to classify the decoded image and the original image into 125 different groups.

When the target block for encoding is a 4×4 block, the decoded pixel $Recon_{i\_}4[6]$ corresponding to the location of the target pixel for correction and the peripheral pixels of the target pixel for correction and the original pixel $Org_{i\_}4[6]$ corresponding to the location of the target pixel for correction and the peripheral pixels of the target pixel for correction are associated and classified according to the type of edge direction i. Here, i denotes any one of numeral values from 1 to 25. The decoded pixel $Recon_{i\_}4[6]$ is the mean of the decoded pixels in a 4×4 block of which the type of edge direction is Here, [6] denotes the number of the target pixel for correction and the peripheral pixels of the target pixel for correction. The original pixel $Org_{i\_}4[6]$ is the mean of the original pixel in a 4×4 block of which the type of edge direction is i.

The decoded pixel $Recon_{i\_}4[6]$ is expressed as follows.

$$Recon_{i\_}4[6] = \frac{\sum_{k=1}^{N_i} recon_{i,k\_}4[6]}{N_i}$$ [Math. 9]

$Recon_{i\_}4[6] = [A0_i, A1_i, A2_i, A3_i, A4_i, A5_i]$ $recon_{i,k\_}4[6] = [a0_{i,k}, a1_{i,k}, a2_{i,k}, a3_{i,k}, a4_{i,k}, a5_{i,k}]$ Here, $recon_{i,k\_}4[6]$ is the pixel value of the decoded pixels of the kth target pixel for correction among the target pixels for correction of which the types of edge directions are i. $N_i$ denotes the number of target pixels for correction of which the types of edge directions are i. $A0_i$, $A1_i$, $A2_i$, $A3_i$, $A4_i$ and $A5_i$ denotes the mean of decoded pixels on the location indicated by a0, a1, a2, a3, a4 and a5 in FIG. 24 respectively. $a0_{i,k}$, $a1_{i,k}$, $a2_{i,k}$, $a3_{i,k}$, $a4_{i,k}$ and $a5_{i,k}$, denotes the pixel value on the location indicated by a0, a1, a2, a3, a4 and a5 in FIG. 24 respectively for kth target pixel for correction.

The original pixel $Org_{i\_}4[6]$ is expressed similar to $Recon_{i\_}4[6]$. The filtering coefficient classification unit 330 uses the decoded pixel $Recon_{i\_}4[6]$ and the original pixel $Org_{idi\_}4[6]$ to calculate a filtering coefficient for each type of edge direction (and each block size) as is the case with the embodiments as described above.

(Method of Selecting Filtering Coefficients)

A method of selecting filtering coefficients is described below.

The filtering coefficient selecting unit 340 calculates the type of edge direction for each target pixel for correction on the periphery of the target block for encoding as is the case with the embodiments as described above.

The filtering coefficient selecting unit 340 extracts a filtering coefficient for each target pixel for correction according to the calculated type of edge direction for each target pixel for correction (and the block size of the target block for encoding). The original image correcting unit 342 generates reference pixels by filtering the target pixels for correction in the peripheral blocks using the extracted filtering coefficients.

(Functional Effects of Variation 2)

The moving image encoding apparatus 300 calculates a filtering coefficient for each type of edge direction of each target pixel for correction. Thus, the filtering coefficients are changed according to the types of reference pixels so that encoding with a higher accuracy is achieved.

<Variation 3>

Next, Variation 3 is described below. Variation 3 has common features with the above embodiment. Therefore, the differences are mainly described and the descriptions of the common features are omitted here.

The moving image encoding apparatus 100 in the above embodiments uses the intra prediction modes (prediction directions) as the classification items for calculating the filtering coefficients. Although the classification is made with 35 types of prediction directions in the above embodiments, the classification is not made according to the prediction directions in Variation 3. That is, Variation 3 corresponds to the case in which the prediction direction is one direction in the above embodiments. Thus, the block sizes of the peripheral blocks of the target block for encoding is classification items for calculating filtering coefficients in Variation 3.

In Variation 3, it is not required to differentiate between the case in which the reference pixels are on the upper side of the target block for encoding and the case in which the reference pixels are on the left side of the target block for encoding.

(Functional Effects of Variation 3)

When the block sizes of the peripheral blocks which include the reference pixels are larger, it is thought that the image in the peripheral blocks is flat and the amount of high-frequency components of the reference pixels for mode determination is small. In addition, when the block sizes of the peripheral blocks which include the reference pixels are smaller, it is thought that the image in the peripheral blocks is complicated and the amount of high-frequency components of the reference pixels for mode determination is large. Thus, the filtering coefficients are changed according to the block sizes of the peripheral blocks which include the reference pixels so that encoding with a higher accuracy is achieved.

(Others)

The embodiments and variations as described above are combined and employed wherever possible.

A technique disclosed herein may achieve moving image encoding for increasing the accuracy of the intra prediction mode determination and improving the image quality with fewer operations.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A moving image encoding apparatus which uses intra prediction to encode an input original image input by frame on the basis of a block in the input original image, the moving image encoding apparatus comprising:
    a decoded image memory configured to store a decoded image of an image one frame before the input original image which includes a target block for encoding, the target block for encoding being a block to be encoded in the input original image;
    an original image memory configured to store an original image corresponding to the decoded image;
    a decoded image peripheral information storing unit configured to store an intra prediction mode for each block in the decoded image;
    a filtering coefficient classification unit configured to calculate a filtering coefficient from the stored decoded image and the stored original image for each intra prediction mode of the decoded image;
    an encoding target block peripheral information readout unit configured to read an intra prediction mode for a peripheral block of the target block for encoding;
    a filtering coefficient selecting unit configured to select a filtering coefficient based on the intra prediction mode for the peripheral block for each peripheral block;
    an original image correcting unit configured to use the filter coefficient selected by the filtering coefficient selecting unit to perform a filtering process to a reference pixel for intra prediction mode determination of the peripheral block and configured to calculate a pixel value as a decoded image of the reference pixel for intra prediction mode determination of the peripheral block;
    a reference image generating unit configured to generate a reference image for intra prediction mode determination from the pixel value as the decoded image obtained from the original image correcting unit;
    an intra prediction mode determination unit configured to use the reference image generated by the reference image generating unit to select an intra prediction mode for the target block for encoding; and
    an intra prediction image generating unit configured to use the intra prediction mode selected by the intra prediction mode determination unit to generate an intra prediction image of the target block for encoding.

2. The moving image encoding apparatus according to claim 1, wherein
    the decoded image peripheral information storing unit stores an intra prediction direction for each block of the decoded image,
    the filtering coefficient classification unit calculates a filtering coefficient for each intra prediction direction from the stored decoded image and the stored original image,
    the encoding target block peripheral information readout unit reads out an intra prediction direction for a peripheral block of the target block for encoding, and
    the filtering coefficient selecting unit selects a filtering coefficient for each peripheral block according to the intra prediction direction of the peripheral block.

3. The moving image encoding apparatus according to claim 1, wherein
    the decoded image peripheral information storing unit stores a variance of the reference pixel for intra prediction mode determination for each block of the decoded image,
    the filtering coefficient classification unit classifies the variances of the reference pixels for intra prediction mode determination into a plurality of groups divided by a plurality of predetermined thresholds and calculates the filtering coefficient for each group from the stored decoded image and the stored original image,
    the encoding target block peripheral information readout unit reads the variances of the reference pixels for intra prediction mode determination for the peripheral blocks of the target block for encoding, and
    the filtering coefficient selecting unit selects a filtering coefficient for each peripheral block according to the variances of the reference pixels for intra prediction mode determination of the peripheral blocks.

4. The moving image encoding apparatus according to claim 1, wherein
    the decoded image peripheral information storing unit stores an edge direction of the reference pixel for intra prediction mode determination for each block of the decoded image,
    the filtering coefficient classification unit calculates a filtering coefficient for each edge direction of the reference pixel for intra prediction mode determination from the stored decoded image and the stored original image,
    the encoding target block peripheral information readout unit reads the edge directions of the reference pixels for intra prediction mode determination for the peripheral blocks of the target block for encoding, and
    the filtering coefficient selecting unit selects a filtering coefficient for each reference pixel for intra prediction mode determination of the peripheral blocks according to the edge directions of the reference pixels for intra prediction mode determination of the peripheral blocks.

5. The moving image encoding apparatus according to claim 1, wherein
    the decoded image peripheral information storing unit stores a block size of each block of the decoded image,
    the filtering coefficient classification unit calculates a filtering coefficient for each block size of each block from the stored decoded image and the stored original image,
    the encoding target block peripheral information readout unit reads out the block sizes of the peripheral blocks of the target block for encoding, and
    the filtering coefficient selecting unit selects a filtering coefficient for each peripheral block according to the block sizes of the peripheral blocks.

* * * * *